(12) United States Patent
Scott et al.

(10) Patent No.: US 10,766,759 B2
(45) Date of Patent: Sep. 8, 2020

(54) VOLATILE LIQUIDS TRANSFER APPARATUS WITH SAFETY LOCK

(71) Applicants: Steven Richard Scott, Curlew, WA (US); Jeffrey Nicholas Wilson, Roseville, CA (US)

(72) Inventors: Steven Richard Scott, Curlew, WA (US); Jeffrey Nicholas Wilson, Roseville, CA (US)

(73) Assignee: Motion Pro, Inc., Loomis, CA (US)

( * ) Notice: Subject to any disclaimer, the term of this patent is extended or adjusted under 35 U.S.C. 154(b) by 7 days.

(21) Appl. No.: 16/383,938

(22) Filed: Apr. 15, 2019

(65) Prior Publication Data

US 2019/0256342 A1     Aug. 22, 2019

Related U.S. Application Data

(63) Continuation-in-part of application No. 16/138,215, filed on Sep. 21, 2018, now Pat. No. 10,723,612, and a continuation-in-part of application No. 15/710,113, filed on Sep. 20, 2017, now Pat. No. 10,618,797, and a continuation-in-part of application No. 15/449,986, filed on Mar. 5, 2017, now Pat. No. 10,259,700.

(51) Int. Cl.
| | | |
|---|---|---|
| *B67D 7/04* | (2010.01) | |
| *B67D 7/32* | (2010.01) | |
| *F16L 37/107* | (2006.01) | |
| *B67D 7/54* | (2010.01) | |
| *B67D 7/00* | (2010.01) | |
| *B67D 7/06* | (2010.01) | |

(52) U.S. Cl.
CPC .......... *B67D 7/3209* (2013.01); *B67D 7/005* (2013.01); *B67D 7/04* (2013.01); *B67D 7/06* (2013.01); *B67D 7/3245* (2013.01); *B67D 7/54* (2013.01); *F16L 37/107* (2013.01)

(58) Field of Classification Search
CPC .......... B67D 7/3209; B67D 7/04; B67D 7/06; B67D 7/005; B67D 7/54; B67D 7/3245; B67D 7/0294; F16L 37/107; F16K 27/0209; F16K 31/521; F16K 17/00; F17C 13/00
See application file for complete search history.

(56) References Cited

U.S. PATENT DOCUMENTS

| | | | | |
|---|---|---|---|---|
| 2,737,401 A * | 3/1956 | Griffith | ................. | F16L 37/107 137/553 |
| 3,911,973 A * | 10/1975 | Casteline, Jr. | ........... | B67D 7/54 141/59 |
| 4,638,842 A * | 1/1987 | Hawley | .................... | B67D 7/42 141/302 |
| 6,506,513 B1 * | 1/2003 | Yonetsu | ............ | H01M 8/04186 429/448 |
| 6,622,760 B2 * | 9/2003 | Peattie | ................. | B67D 7/0294 141/206 |
| 6,713,201 B2 * | 3/2004 | Bullock | ................. | H01M 8/04 347/7 |

(Continued)

*Primary Examiner* — Nicolas A Arnett
(74) *Attorney, Agent, or Firm* — Larry B. Guernsey; Patent Law Office of Larry B. Guernsey

(57) ABSTRACT

A volatile liquid refueling apparatus, which includes a probe, and a receiver including a dual locking mechanism whereby said apparatus can be locked in either an open position or a closed position, and a safety lock which disables or enables access to the dual locking mechanism when manually.

5 Claims, 20 Drawing Sheets

(56) References Cited

U.S. PATENT DOCUMENTS

| | | | | |
|---|---|---|---|---|
| 7,004,207 | B2* | 2/2006 | Finkelshtain | H01M 8/04186 141/100 |
| 8,776,843 | B2* | 7/2014 | Komiya | B65B 3/04 141/93 |
| 10,259,700 | B2* | 4/2019 | Scott | F16K 31/528 |
| 2004/0209142 | A1* | 10/2004 | Becerra | H01M 8/1011 141/349 |
| 2005/0008908 | A1* | 1/2005 | Kaye | H01M 16/006 429/410 |
| 2005/0019641 | A1* | 1/2005 | Aoyama | H01M 8/04186 429/446 |
| 2005/0084722 | A1* | 4/2005 | Bullock | H01M 8/04208 429/462 |
| 2005/0255361 | A1* | 11/2005 | Saito | H01M 8/0278 429/508 |
| 2006/0006108 | A1* | 1/2006 | Arias | H01M 8/04447 210/232 |
| 2006/0078769 | A1* | 4/2006 | Andoh | H01M 8/04201 429/449 |
| 2006/0078770 | A1* | 4/2006 | Takahashi | H01M 8/04186 429/449 |
| 2006/0260715 | A1* | 11/2006 | Muller | H01M 8/04201 141/355 |
| 2013/0327439 | A1* | 12/2013 | Pitney | F17C 5/06 141/346 |

* cited by examiner

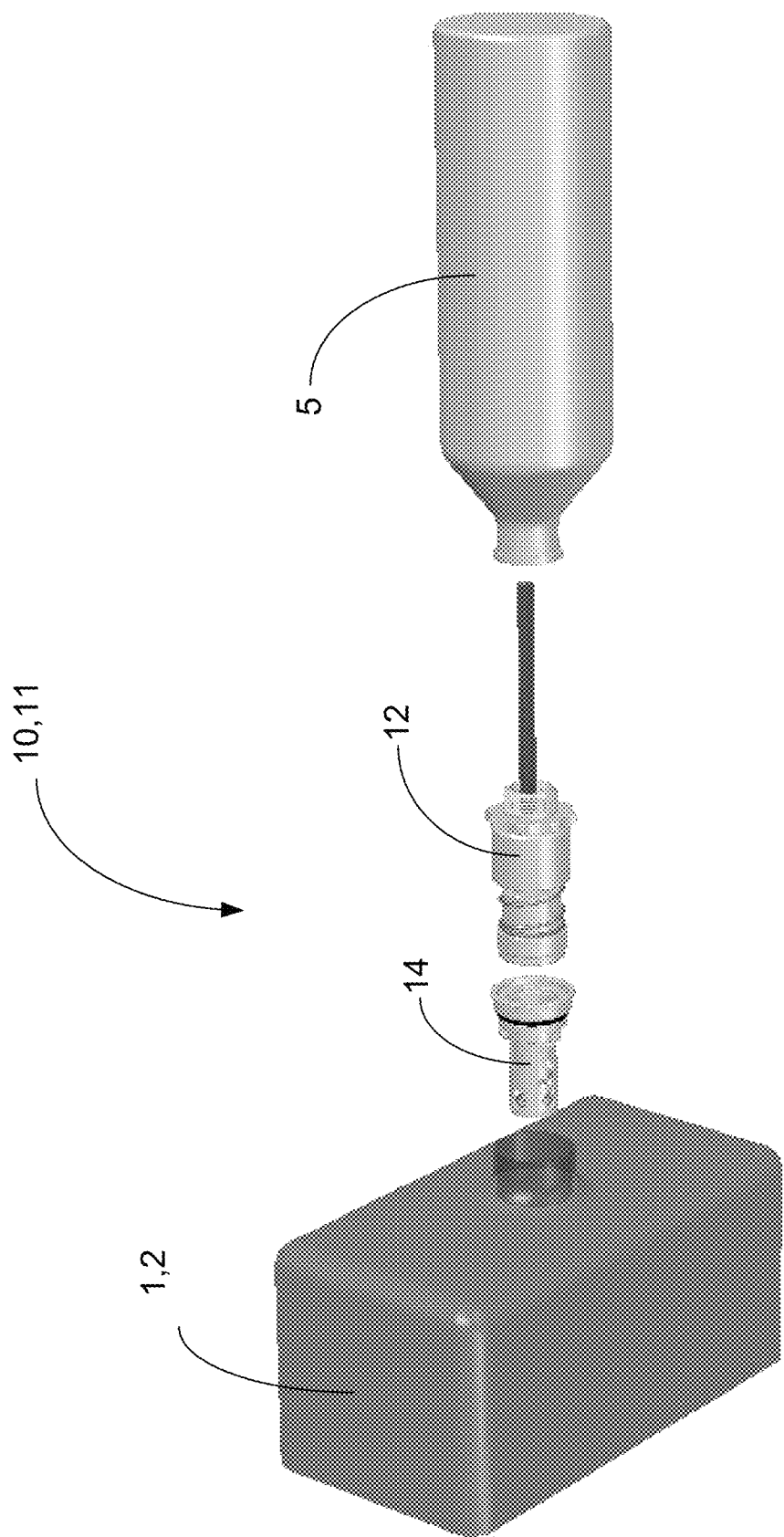

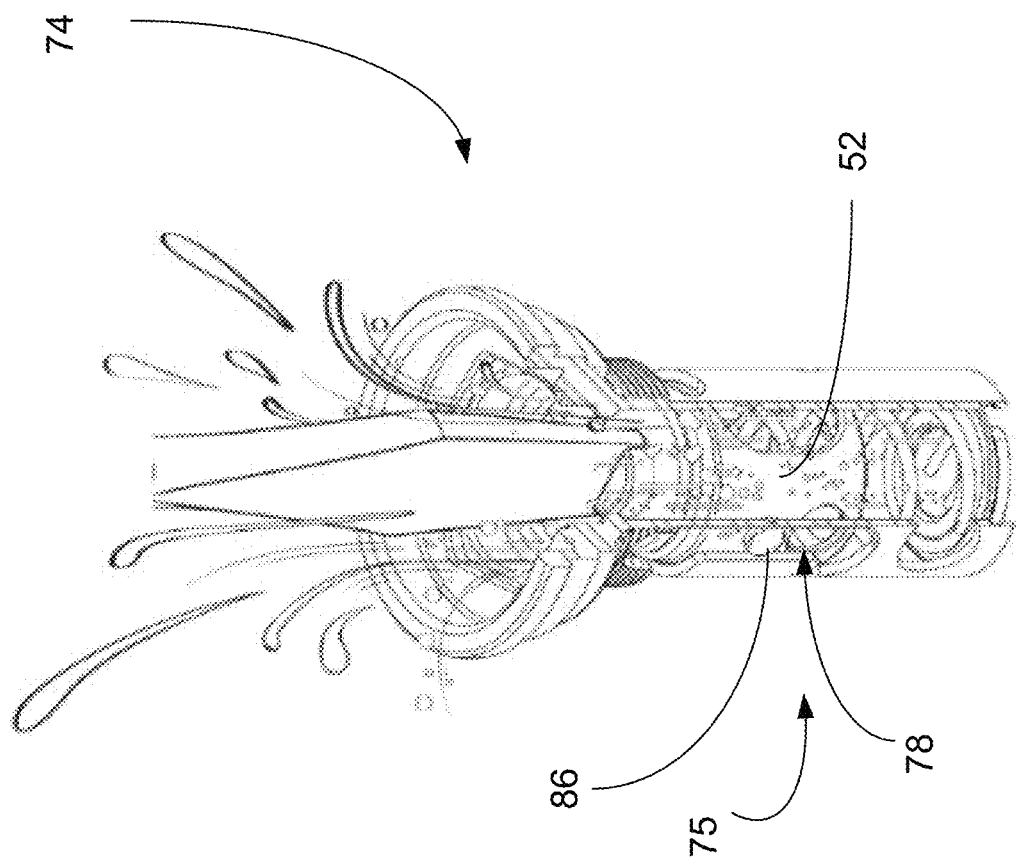
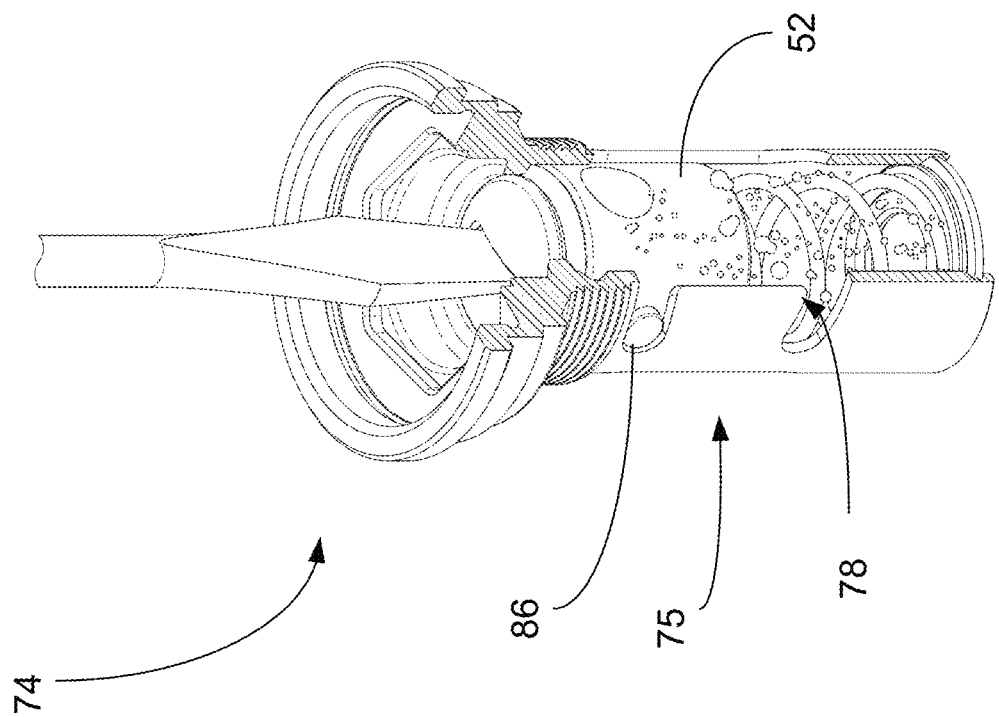
FIGURE 16A
FIGURE 16B

VOLATILE LIQUIDS TRANSFER APPARATUS WITH SAFETY LOCK

This application is a Continuation-In-Part of and claims priority to co-pending parent application Ser. No. 15/449,986 filed Mar. 5, 2017 and Ser. No. 15/710,113 filed Sep. 20, 2017, and Ser. No. 16/138,215 filed Sep. 21, 2018.

TECHNICAL FIELD

The present invention relates generally to devices for refueling mechanical engines.

BACKGROUND ART

There are several situations in which motorized equipment operates using a supply of volatile fuel such as gasoline or kerosine. When equipment must be operated continuously in order to function properly, there is a need to replenish the supply of fuel quickly, safely, and possibly while the motorized equipment continues to function uninterrupted.

One such example of this kind of situation is when gasoline-powered chain saws are used to cut away brush and foliage during a forest fire, in order to create fire breaks. When a fire-fighter needs to refuel his saw, while acting in a dangerous environment with open flames near at hand, it is extremely crucial that transfer of flammable fuel is conducted in an extremely safe manner. Since gasoline is notoriously volatile, it is extremely important that refueling operations do not allow the release of volatile vapors that can ignite with potentially deadly consequences. Thus there is a need for an apparatus and method that can transfer volatile fluids in a manner which contains flammable vapors from the fuel as it is being transferred to the operating saw.

During operation in firefighting, the fuel tanks in gasoline powered saws such as Stihl saws build up excess pressure due to heat. The fuel tanks and caps in these saws are not capable of venting this excess pressure and when the cap is opened during the fueling process, fuel vapor is released under pressure causing a severe safety hazard. A method of safely relieving the pressure buildup inside the fuel tank before the cap is opened is necessary.

Gasoline powered chainsaws require fuel to operate. Normally fueling is done as follows:

Remove cap on saw gas tank;

Remove seal cap on portable fuel container and install safety spout;

Lift portable fuel container and insert safety spout into chainsaw fuel tank;

When gas starts to overflow from chainsaw tank, remove spout to stop dispensing gasoline;

Reinstall gas cap on chainsaw; and

Remove safety spout from portable fuel container and reinstall seal cap.

This method requires many steps during which vapors from the fuel tank and refueling tank are open to the air and to any sparks or other conditions which may expose these vapors to possible explosion. It is also slow to implement in emergency conditions during which each second may be of crucial importance. The persons using this method may be exposed to considerable stress which may be distracting. Clearly, the simpler the method, the better, while in emergency conditions.

Further disadvantages of this prior art system are that in the course of refueling a hot chainsaw under existing conventional means, the operator has to remove that cap of chainsaw. In many cases, the fuel in the tank of the chainsaw is heated above its boiling point and the tank has become pressurized. When this happens and the cap is opened, it can cause fuel to spray out under pressure which has resulted in numerous reports of serious burns to chainsaw operators and a high risk of injury. This process also releases huge amounts of fuel vapor into the atmosphere. In addition, the conventional fueling method required time consuming process of removing and replacing caps, potential for portable fuel container to be spill fuel if knocked over accidentally, and continuous release of fuel vapor into the atmosphere during the refueling process. Just the release of fuel vapor during the refueling process created a health hazard and risk of fire and injury to the user and surrounding property. In addition, if an operator drops the chainsaw and/or fuel tank during the refueling process (for example if sprayed with fuel, accidentally drop, or emergency occurs) fuel will spill out of both the chainsaw tank and the open portable fuel container.

What is needed is a system and method that will eliminate the need for fuel or vapor to be exposed to the atmosphere during the refueling process. This method of refueling is called a "vapor-tight system". The basic system works on a fluid exchange principle, instead of a displacement principle. Typically, it is necessary to open both the fuel cap on the saw in addition to the cap on the fuel can, and then pour liquid fuel into the saw exposing both the fuel and vapor to the atmosphere. In contrast a vapor-tight system is sealed. Once the fuel probe and the fuel tank are connected, fluid is simply exchanged from one to the other.

The method disclosed in this invention using this system of components provides a vapor-tight enclosure while provide a quicker, more secure and less dangerous means of transferring fuel under hazardous conditions.

The system used in this method comprises two parts, a receiver that permanently replaces the gas cap on the chainsaw fuel tank and a probe that permanently replaces the seal cap and safety spout normally used on portable fuel containers. In general terms, once the receiver and probe are in place, it is used as follows:

1) Pick up portable fuel container and insert probe into receiver on the chainsaw.
2) While probe is fully engaged into receiver on chainsaw, hold portable fuel container above saw for 10 seconds or until fuel stops flowing. Tank is now full.

Thus, there is a need for a volatile liquids refueling apparatus which contains volatile fuel vapors during refueling operations and a method of working.

A further need is exhibited in the prior art which can be dangerous to an operator. The prior receiver can be locked or unlocked, and if the receiver is in the "unlocked" position it is possible to accidently open the receiver either with your finger or the bar tool. This would release pressure and cause a potential fuel geyser. The plunger is in the locked position, the user opens the cap and inserts a bar tool "screw driver" to unlock the plunger. While twisting the plunger to unlock it, they press down slightly while turning. As soon as the plunger rotates far enough to unlock it gets depressed slightly. This will open the receiver allowing fuel and vapor "geyser" to escape.

Thus, there is a need for a volatile liquids refueling apparatus which minimizes geysering of volatile fuel vapors during refueling operations, and prevents fuel from escaping accidentally.

DISCLOSURE OF INVENTION

Briefly, one preferred embodiment of the present invention is a volatile liquids refueling apparatus and method of working.

An advantage of the present invention is that it contains volatile vapors as fuel is transferred.

Another advantage is that the apparatus of the present invention can be locked in either the open position so the user can fill or empty the tank without the use of the probe if necessary, using the chainsaw bar tool or screwdriver, or in the closed position, to prevent spillage during transport.

A further advantage of the present invention is that the receiver uses a tube design with a single spring, thus reducing the cost of manufacturing and greatly simplifying the design.

Another advantage of the present invention is that the apparatus can be installed using a standard chain saw bar tool instead of multiple bolts to secure and seal it to the tank. The probe is designed to be attached to a standard SIG fuel bottle (camping fuel bottle). The probe can be installed on the fuel bottle without the use of tools by incorporating a grip onto the adaptor.

Yet another advantage of the present invention is that the typical tank of a chain saw can be filled in less than 15 seconds from empty to full.

Another advantage of the present invention is that it works on a fluid exchange principle, instead of a displacement principle.

A yet further advantage of the present invention is that the inclusion of springs in the probe and the receiver of the system add an additional level of safety in the field because if the device being fueled and the fuel bottle are dropped in an emergency situation (for example running from sudden fire surge or falling tree limb) the springs will act to automatically disengage the fuel bottle from the device being fueled and close themselves off, and thereby prevent accidental fuel spill and potential for a dangerous flammable fuel spill. Existing devices do not have this feature and will not necessarily disengage if the user drops them or stops putting pressure on the filler side to hold it into the receiver side. This feature adds a significant level of added safety when the device is being used in a firefighting scenario or other situation where a fuel spill could pose extreme danger to the user and anybody close by.

Also, an advantage of the present method is that it is a much simpler way of simply transferring fuel, which is less confusing and easier to enact under emergency circumstances.

Further, an advantage of the present invention is that "geysering" of fuel is reduced by providing a safety lock when manual opening of the device is used, which serves to prevent accidental releases of pressure and to alert the user to be aware of geysering dangers.

These and other advantages of the present invention will become clear to those skilled in the art in view of the description of the best presently known mode of carrying out the invention of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which:

FIG. 1 shows an exploded view of the major elements of the present invention in use with the tank of a fueled device;

FIGS. 16A-B show geysering of fuel which is to be minimized;

DETAILED DESCRIPTION OF THE PREFERRED EMBODIMENTS

Figure 3:
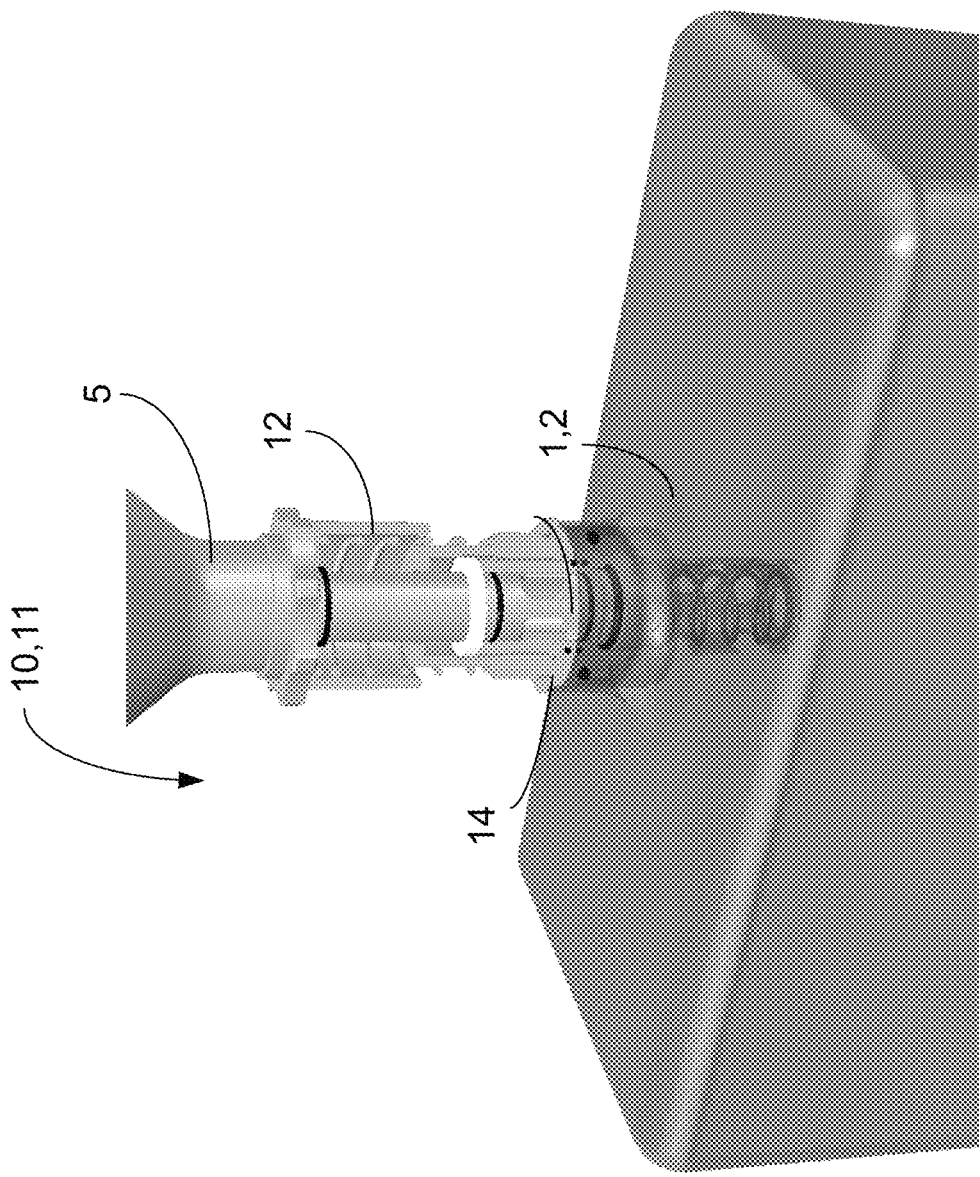
FIG. 3 shows a detailed view of the present invention in use with the tank of a fueled device.
Figure 2:
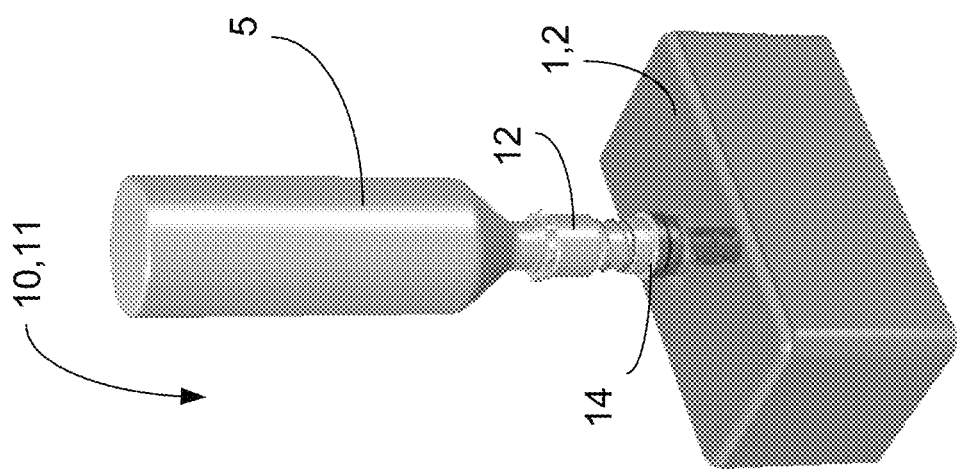
FIG. 2 shows the present invention in use with the tank of a fueled device.

The present invention is a volatile liquids refueling apparatus. It includes a probe 12 and a receiver 14, and together the overall apparatus will be referred to as the refueling apparatus 10. The present refueling apparatus 10 provides a vapor-tight enclosure 11, which allows the transfer of volatile liquids while containing any ignitable vapors The refueling apparatus 10 is designed to work with a fueled device, such as a chain saw (not shown), illustrated in FIG. 1, which may be in need of refueling during continuous operations, such as when being used to create fire breaks when fighting forest fires. The chain saw has a fuel tank 2 with an input port 3 which is closed with a cap (not shown). When in use, the receiver 14 replaces the cap on the fuel tank 2.

The probe 12 is attached or connected to a refueling source, such as a fuel bottle 5, which is typically a bottle or possible a hose that supplies fuel through the probe 12.

When in use, the probe 12 with attached fuel bottle 5 engages the receiver 14 which has been stationed in the tank 2 of the chain saw. The attachment of the probe 12 takes place in three basic stages, which are illustrated in FIGS. 6-8, and will be discussed in detail below.

Figure 4B:
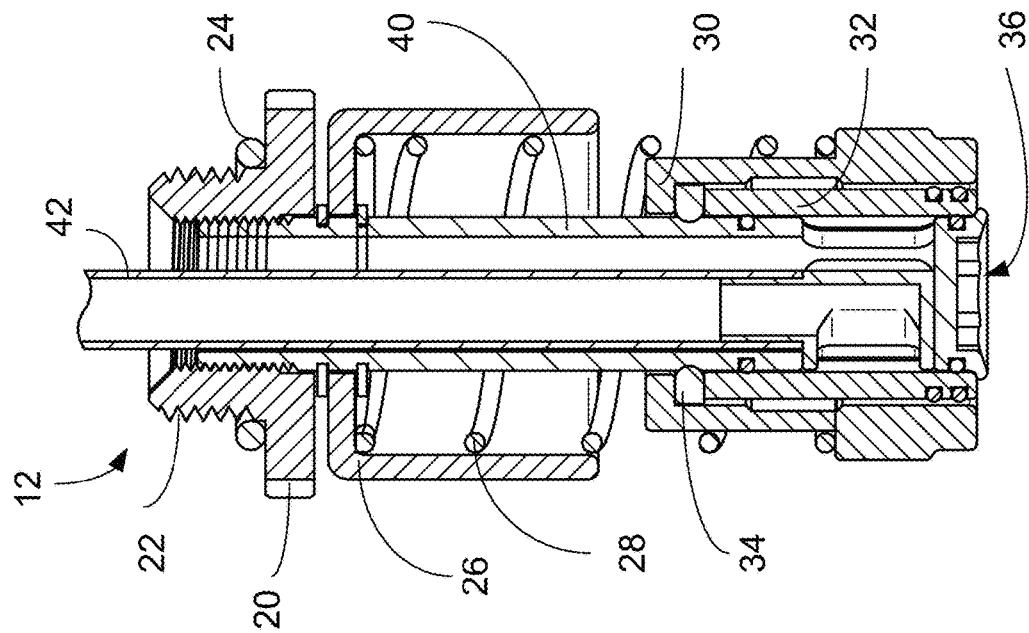
FIG. 4B shows a cut-away view of the probe of the present invention as taken through line B-B of FIG. 4A.
Figure 4A:
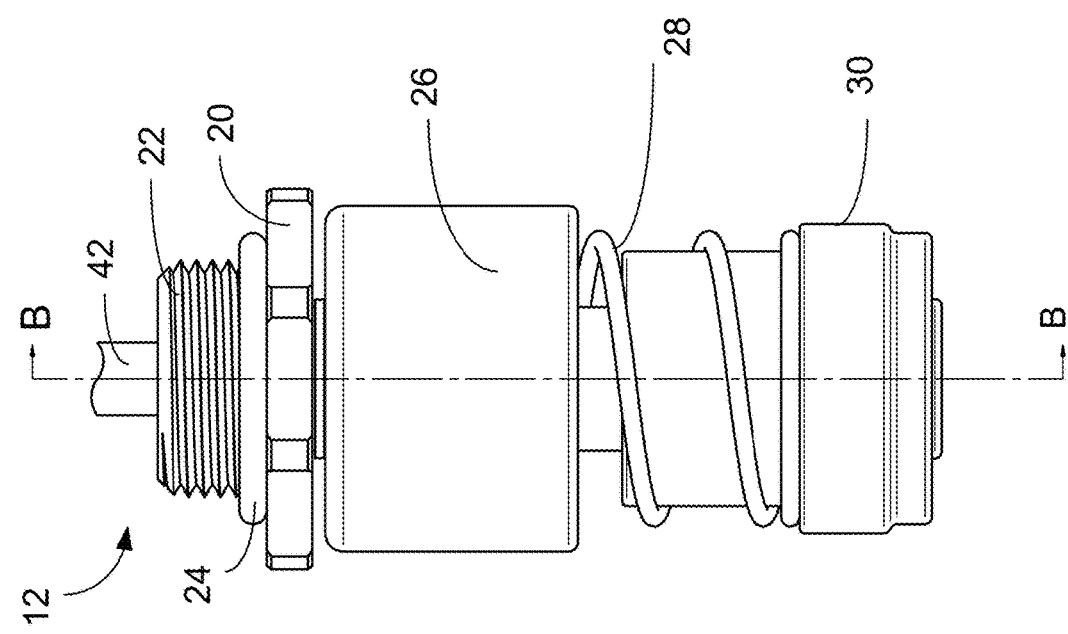
FIG. 4A shows a probe portion of the present invention.

The probe 12 is shown in FIG. 4A and in cross-section in FIG. 4B, which is taken from line A-A in FIG. 4A. Referring now to both FIGS. 4A and 4B, the probe 12 includes fuel bottle adaptor 20 having screw threads 22, an O-ring 24, spring cup 26, spring 28, outer collar 30, seal ring 32, slip ring 34 and aperture 36. Running through the middle of the structure is a central tube 40, which extends into the fuel bottle 5 (see FIG. 1) and directs fuel through the receiver 14 to the fuel tank 2.

Figures 5A, 5B:
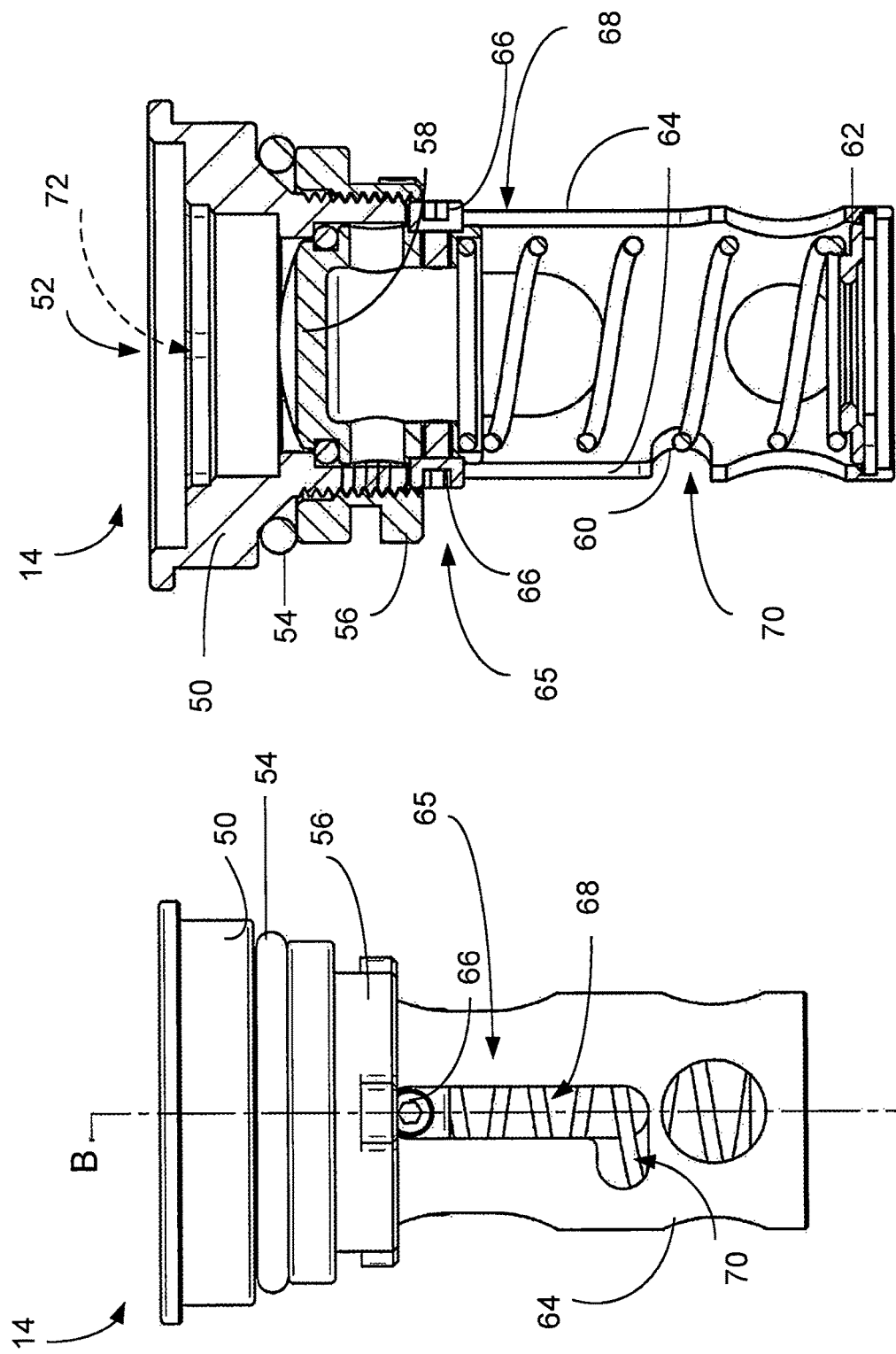
FIG. 5A shows a receiver portion of the present invention.
FIG. 5B shows a cut-away view of the receiver of the present invention as taken through line B-B of FIG. 5A.

The receiver 14 is shown in FIG. 5A and in cross-section in FIG. 5B, which is taken from line B-B in FIG. 5A. Referring now to both FIGS. 5A and 5B, the receiver 14 includes receiver collar 50, receiver aperture 52, O-ring 54, lower adapter 56, plunger 58, spring 60, lower spring plate 62 and receiver housing 64. Also included are a lock-down nut 66 and a lock down channel 68, which will be discussed in more detail below.

Figure 6:
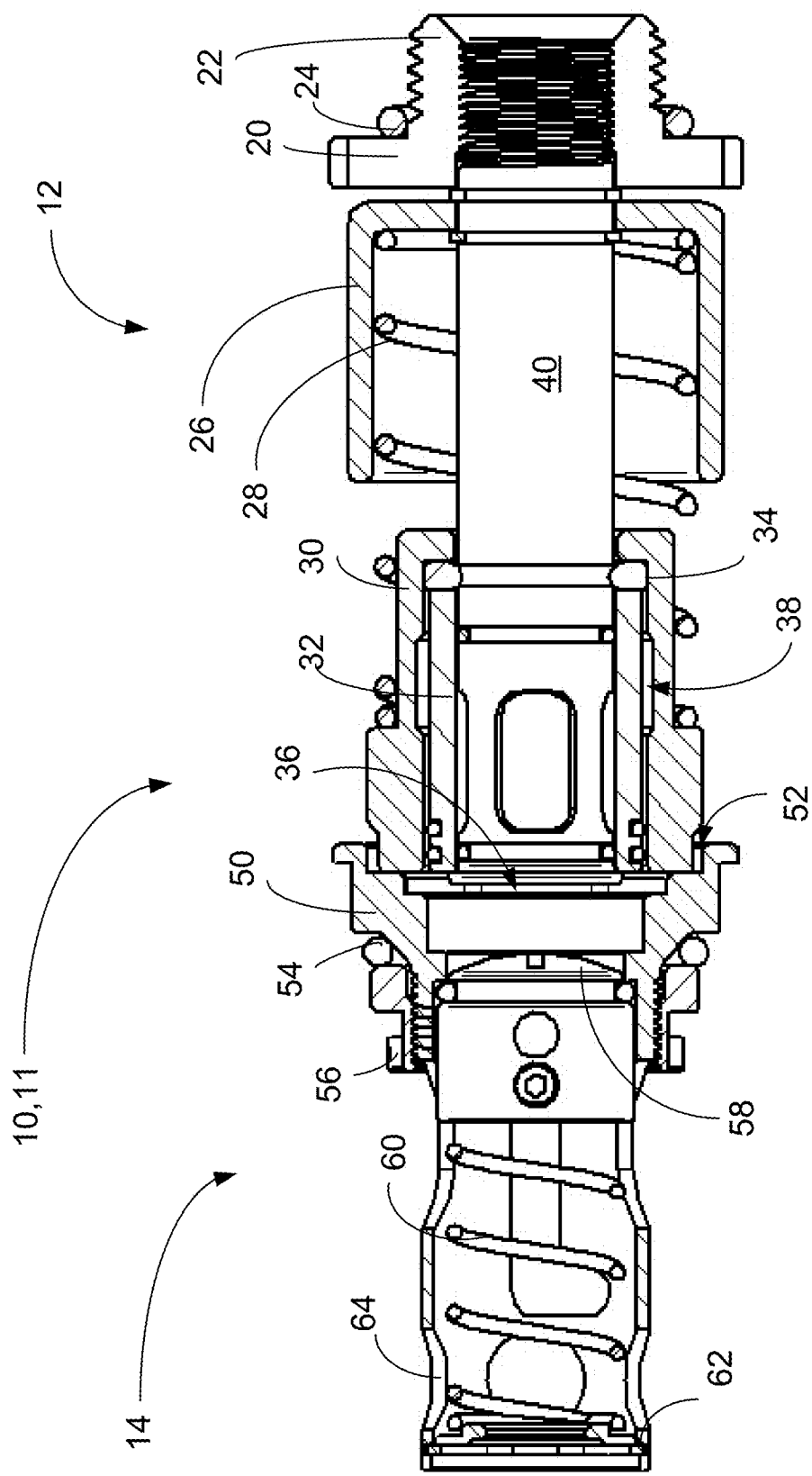
FIG. 6 shows a cut-away view of the apparatus of the present invention in the first stage of attachment.
Figure 7:
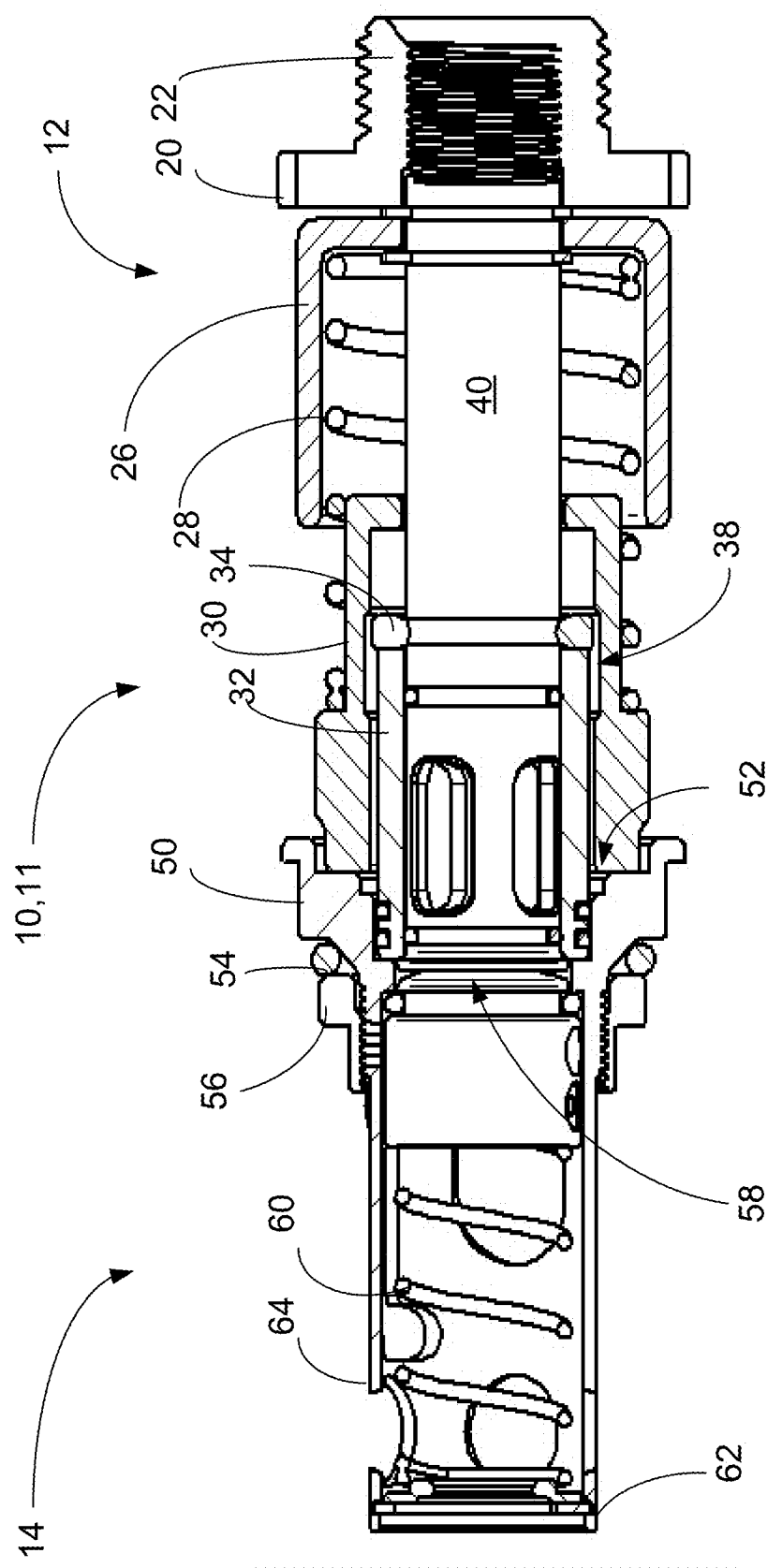
FIG. 7 shows a cut-away view of the apparatus of the present invention in the second stage of attachment.
Figure 8:
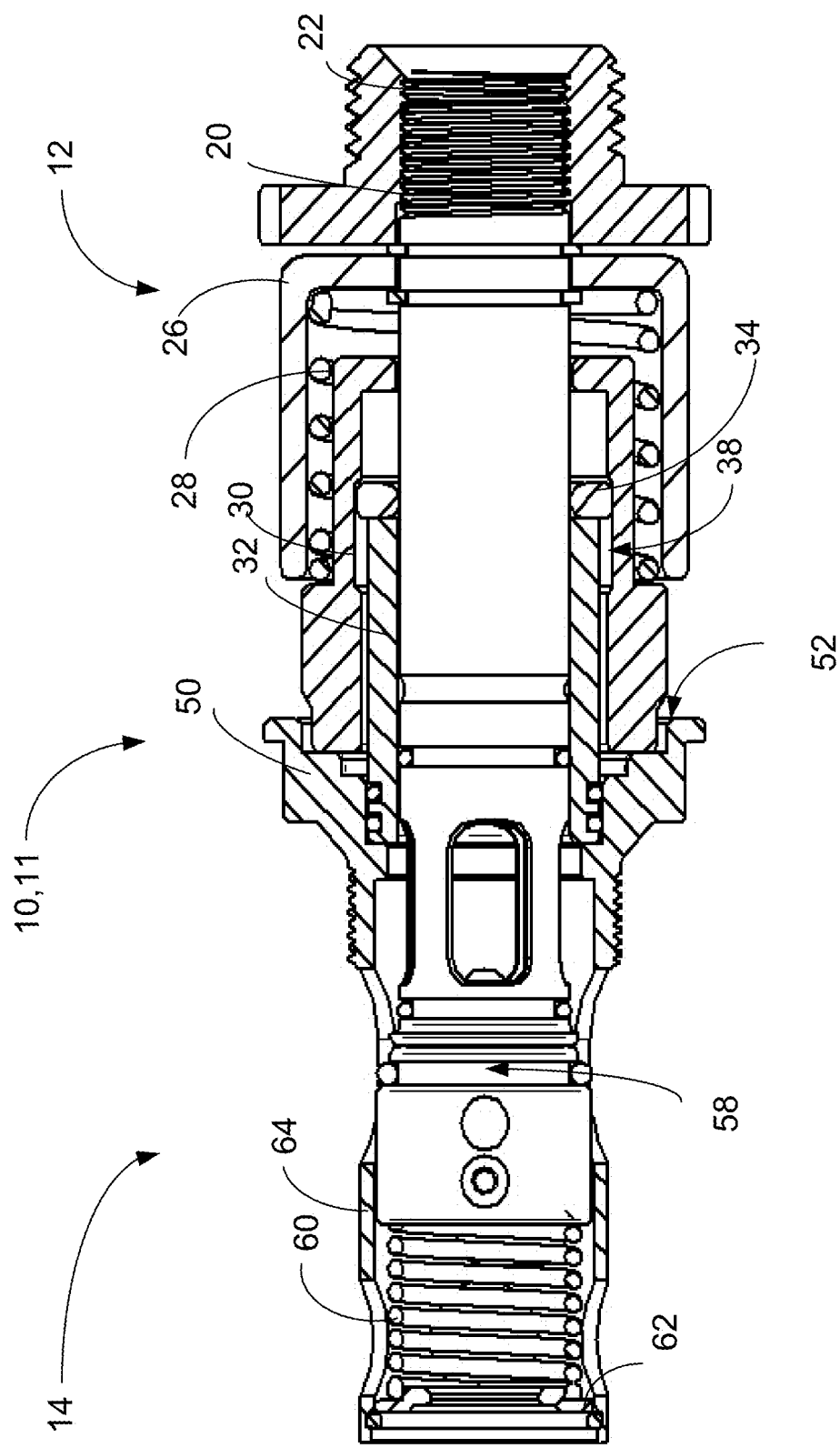
FIG. 8 shows a cut-away view of the apparatus of the present invention in the third stage of attachment.
Figure 10:
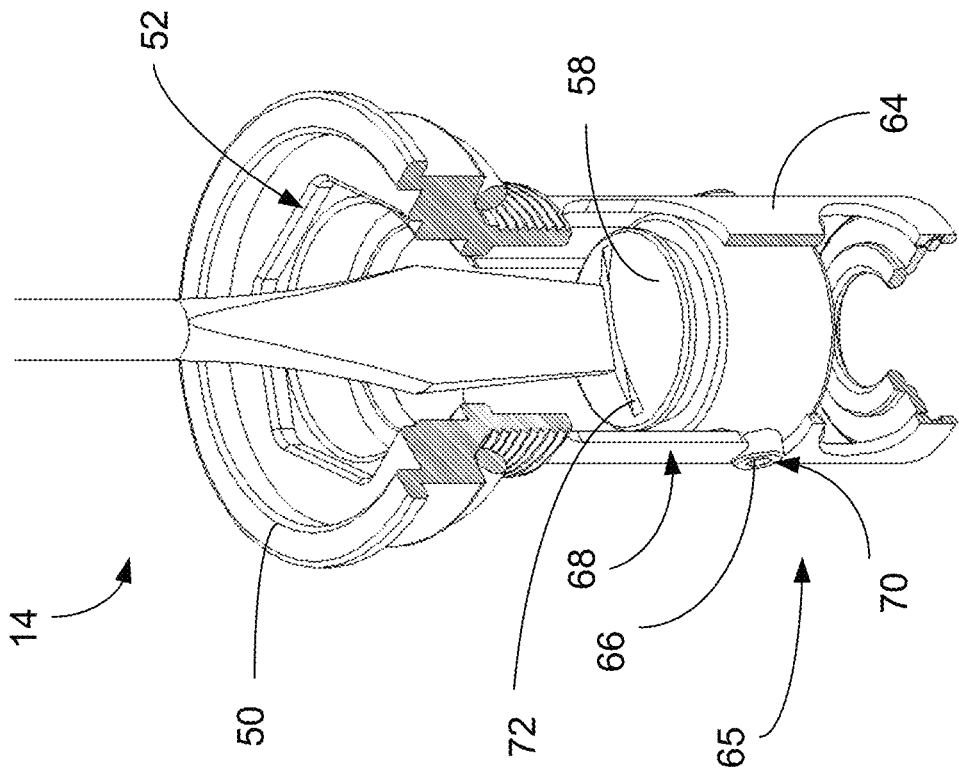
FIG. 10 shows an isometric view with cut-away of the receiver portion of the present apparatus engaged with a screwdriver to engage the lock-down mechanism.
Figure 9:
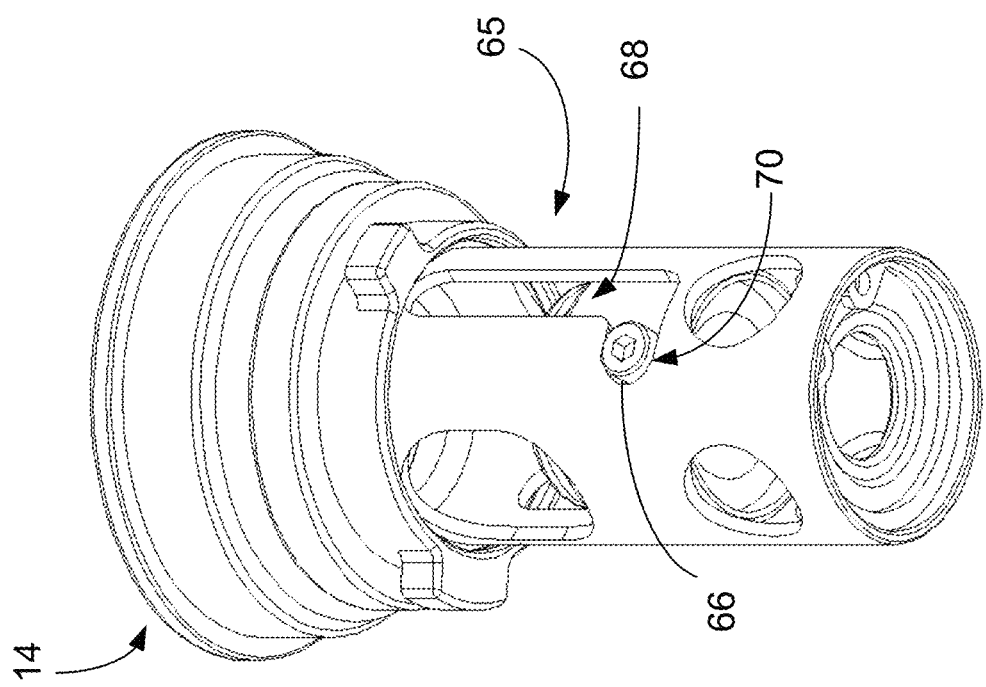
FIG. 9 shows an isometric view of the receiver portion of the present apparatus with the lock-down nut and channel.

FIGS. 6-8 show the three stages of attachment between the probe 12 and the receiver 14. It will be assumed that the receiver 14 has been secured onto the chain saw fuel tank 2 in place of the cap, using the lower adaptor 56. The receiver 14 is installed by removing the original cap, dropping the receiver 14 into the input port (see FIG. 1) and tightening it using the large hex end of a bar tool. The lower adaptor 56 and O-ring 54 configuration are made to fit the same as the original cap, and is preferably made almost entirely of 6061-T6 aluminum in order to keep weight to a minimum and improve durability. Also, vent tube 42, shown in FIG. 4A-B is not shown, but extends from within central tube 40 into the fuel bottle, also not shown, in order to allow vapors to vent from the saw's fuel tank.

The probe 12 is designed to seal against the receiver 14 and is activated in 3 separate stages. The probe 12 includes a slip ring 34, which allows the probe 12 to be extended in the correct order. This is a critical safety feature so that the probe 12 can only be extended if installed into the receiver 14. At no time can it be accidently opened during transportation or storage.

In Stage 1, shown in FIG. 6, the probe 12 is mated with the receiver 14 and is aligned as shown in FIGS. 6, 7, and 8. At this point the receiving aperture 52 and the aperture 36 are aligned. During this stage the slip ring 34 is still in the locked position.

In Stage 2, as seen in FIG. 7, the probe 12 is inserted into the receiver 14 and a seal is made between the seal ring 32 and the receiver 14. At this point the system is now in a sealed state and no vapors, pressure or fuel can escape into the atmosphere. In addition, the outer collar 30 is moved into position so that the slip ring 34 can be pushed up by the seal ring 32. During this stage no fuel has been exchanged.

In Stage 3, as shown in FIG. 8, the probe 12 is further inserted into the receiver 14. As the probe extends it makes contact with the plunger 58 and is pressed down breaking the seal with the upper lip on the receiving collar 50. At this point the seal is also broken between the central tube 40 and the seal ring 32 and allows fuel to flow and air to return though the vent tube 42.

This works on a fluid exchange principle, instead of a displacement principle. Typically, it is necessary to open both the fuel cap on the saw in addition to the cap on the fuel can, and then pour liquid fuel into the saw exposing both the fuel and vapor to the atmosphere. In contrast, the present apparatus is sealed providing a vapor-tight compound enclosure 11. Once the fuel probe 12 and the fuel tank 2 are connected, fluid is simply exchanged from one to the other without back pressure to inhibit the flow.

As the probe 12 is retracted fuel stops flowing once the central tube 40 becomes fully retracted into the seal ring 32. At the same time the plunger 58 seal the fuel tank as it mates with the upper lip on the receiving collar 50. Finally the slip ring 34 is pushed back into the groove on the central tube 40 as illustrated in FIG. 7 and the seal is broken between the seal ring 38 and the receiving collar 50.

This method is discussed in more detail below.

An important feature of the present invention is that the apparatus of the present invention can be locked in the open position so the user can fill or empty the tank 2 without the use of the probe 12 if necessary, using a chainsaw bar tool or screwdriver.

Referring now to FIGS. 5A-B and FIGS. 9 and 10, a slot 72 in the top of the plunger 58 and a lock-down mechanism 65 allow the user to press the plunger 58 down with a bar tool or screw driver and turn it to lock it in an open position. The lock-down mechanism preferably includes a lock-down screw 66 which travels down a lock-down channel 68 and is turned into a side passage 70 by rotation of the screw slot 70, where the lock-down screw 66 is captured. This locks the plunger 58 in the down position so that the saw can be filled with a traditional fuel container.

A further embodiment of the present invention includes a dual locking receiver which can be locked in either an open position or a closed position. This is a safety feature that ensures that the receiver cannot be opened even if the probe is installed. Thus, in the case of an accident or during transport there is no possibility of the receiver being opened and fuel or vapor escaping. This feature is engaged again by inserting a screw driver or "bar tool" into the slot on the plunger and turning it 45 degrees.

Referring now to FIGS. 5A-B and FIGS. 11 through 14, a slot 72 in the top of the plunger 58 and a dual locking mechanism 75 allow the user to press the plunger 58 down with a bar tool or screw driver and turn it to lock it in can be locked in either an open position or a closed position.

Figure 12:
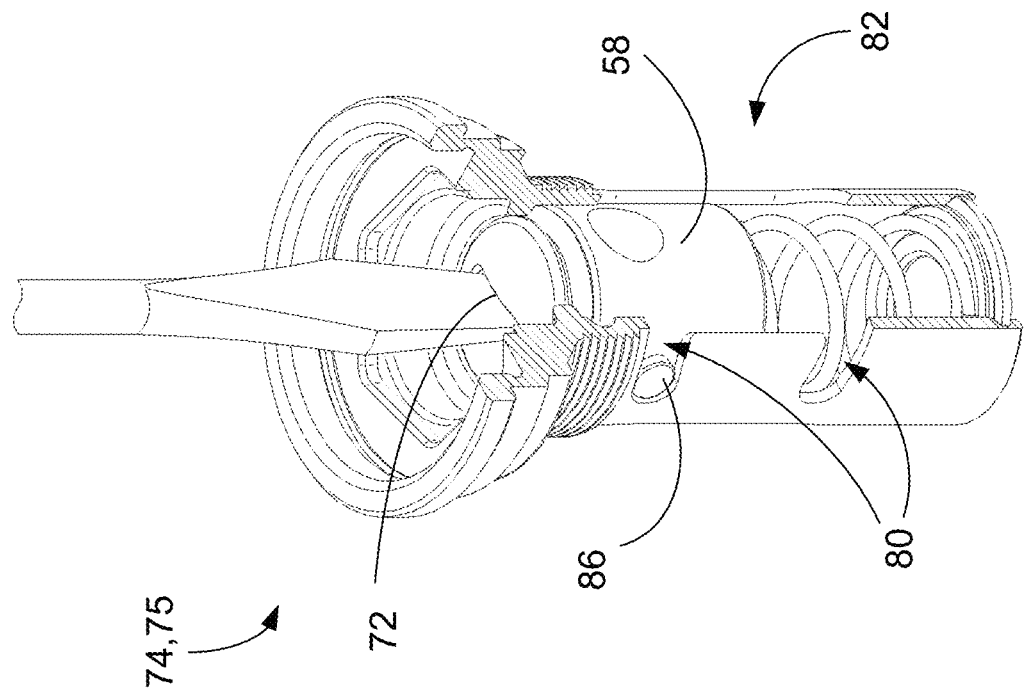
FIG. 12 shows an isometric view with cut-away of the receiver portion of the present apparatus which locks in both open and closed configurations engaged with a screwdriver to engage the dual locking mechanism in the lock closed position.
Figure 11:
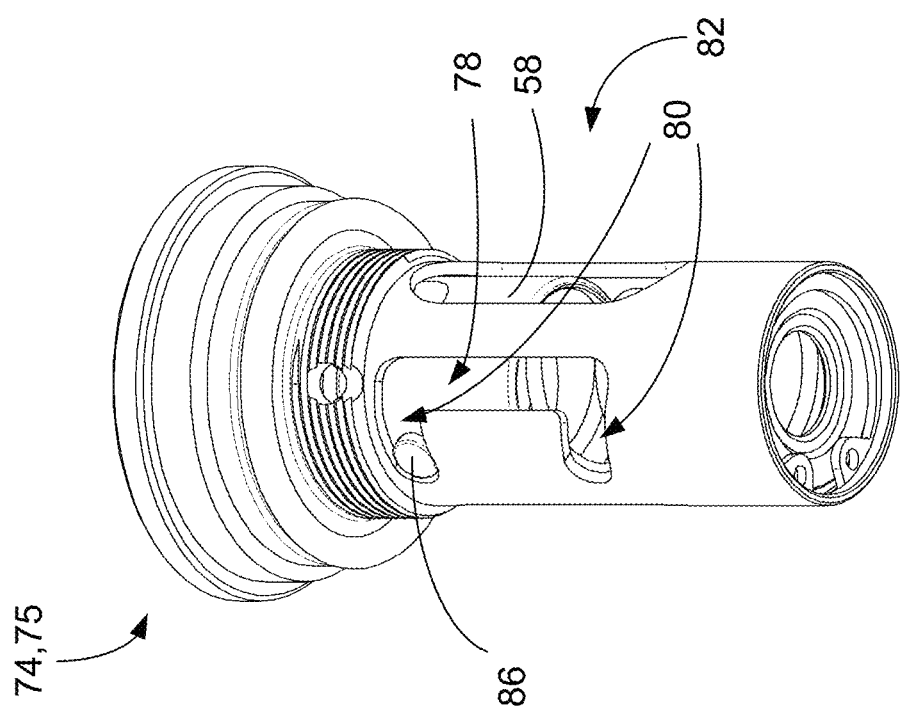
FIG. 11 shows an isometric view of the receiver portion of the present apparatus with the lock-down nut and channel which locks in both open and closed configurations, which is positioned in the lock closed position.

In FIGS. 11 and 12, the dual locking receiver 74 is shown in the locked closed position 82. The dual locking mechanism 75 preferably includes a lock-down protrusion 86, which could be a screw or pin, which travels down a dual locking channel 78 and is turned into one of two dual side passages 80 by rotation of the screw slot 72, where the lock-down screw 66 is captured. This locks the plunger 58 in the locked closed 82 position so that the saw can be transported without fear of leakage or spillage.

Figure 14:
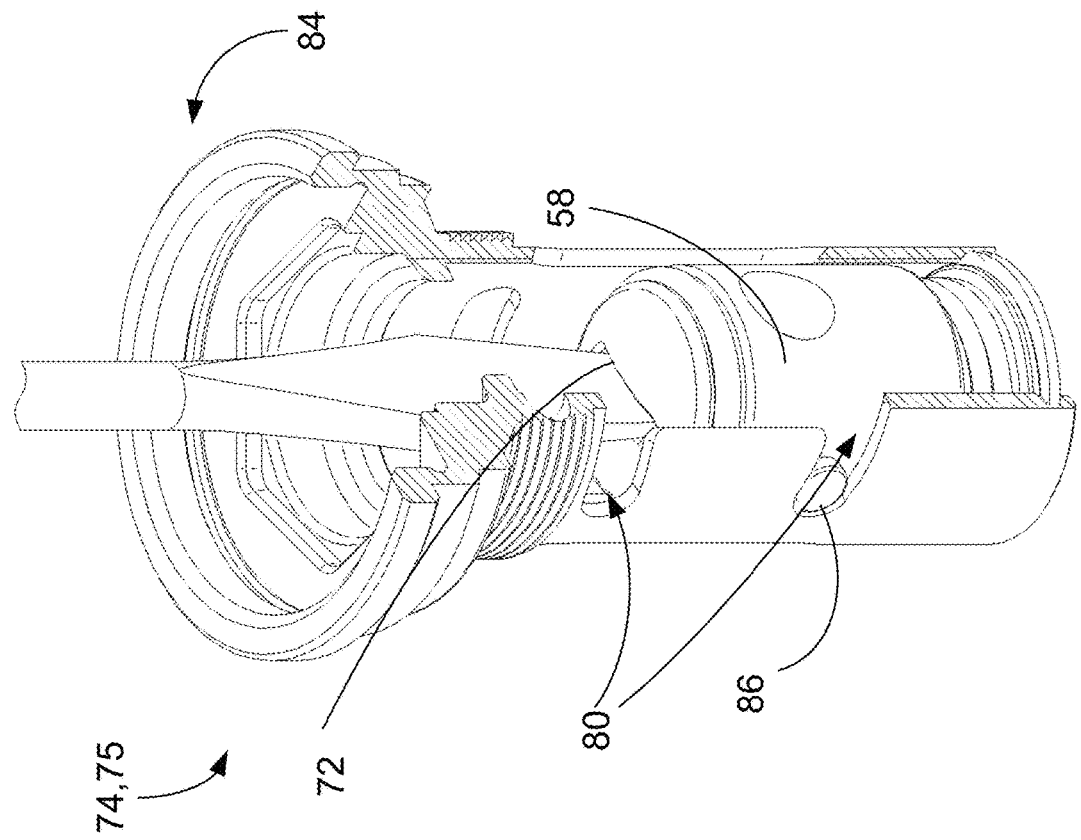
FIG. 14 shows an isometric view with cut-away of the receiver portion of the present apparatus which locks in both open and closed configurations engaged with a screwdriver to engage the dual locking mechanism in the lock open position.
Figure 13:
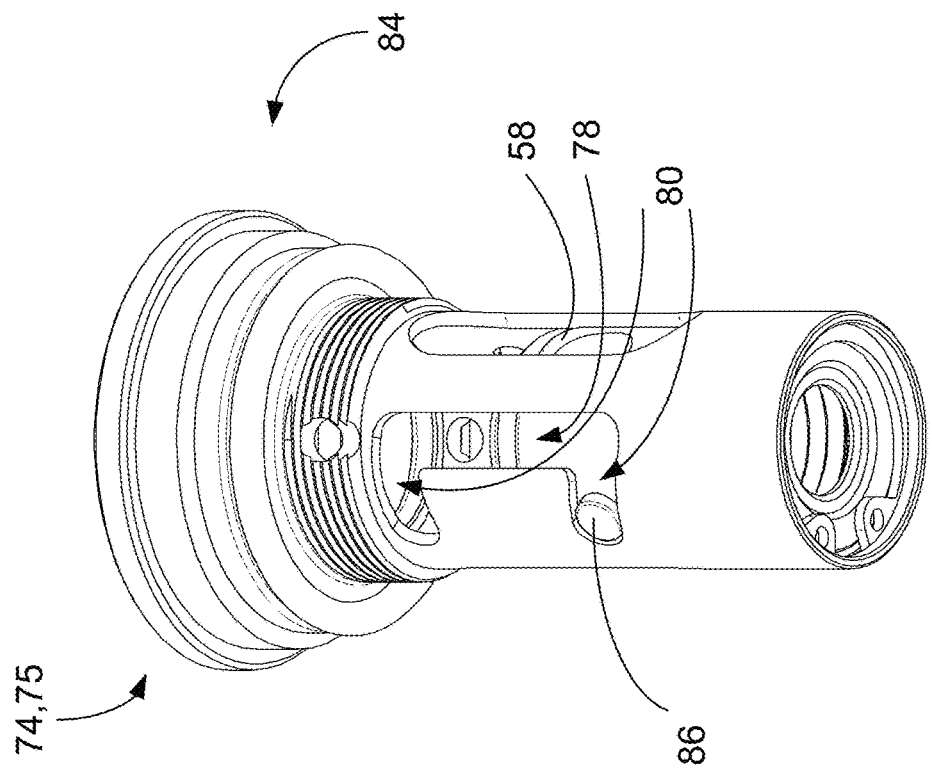
FIG. 13 shows an isometric view of the receiver portion of the present apparatus with the lock-down nut and channel which locks in both open and closed configurations, which is positioned in the lock open position.

In FIGS. 13 and 14, the dual locking receiver 74 is shown in the locked open position 84. The dual locking mechanism 75 preferably includes a lock-down protrusion 86, which could be a screw or pin, which travels down a dual locking channel 78 and is turned into one of two dual side passages 80 by rotation of the screw slot 72, where the locking screw 66 is captured. This locks the plunger 58 in the locked open 84 position so that the saw can be filled with a traditional fuel container.

The threaded adaptor 20 allows the present apparatus to be installed by hand (no tools needed) onto a standard fuel (SIG) bottle.

Figure 15:
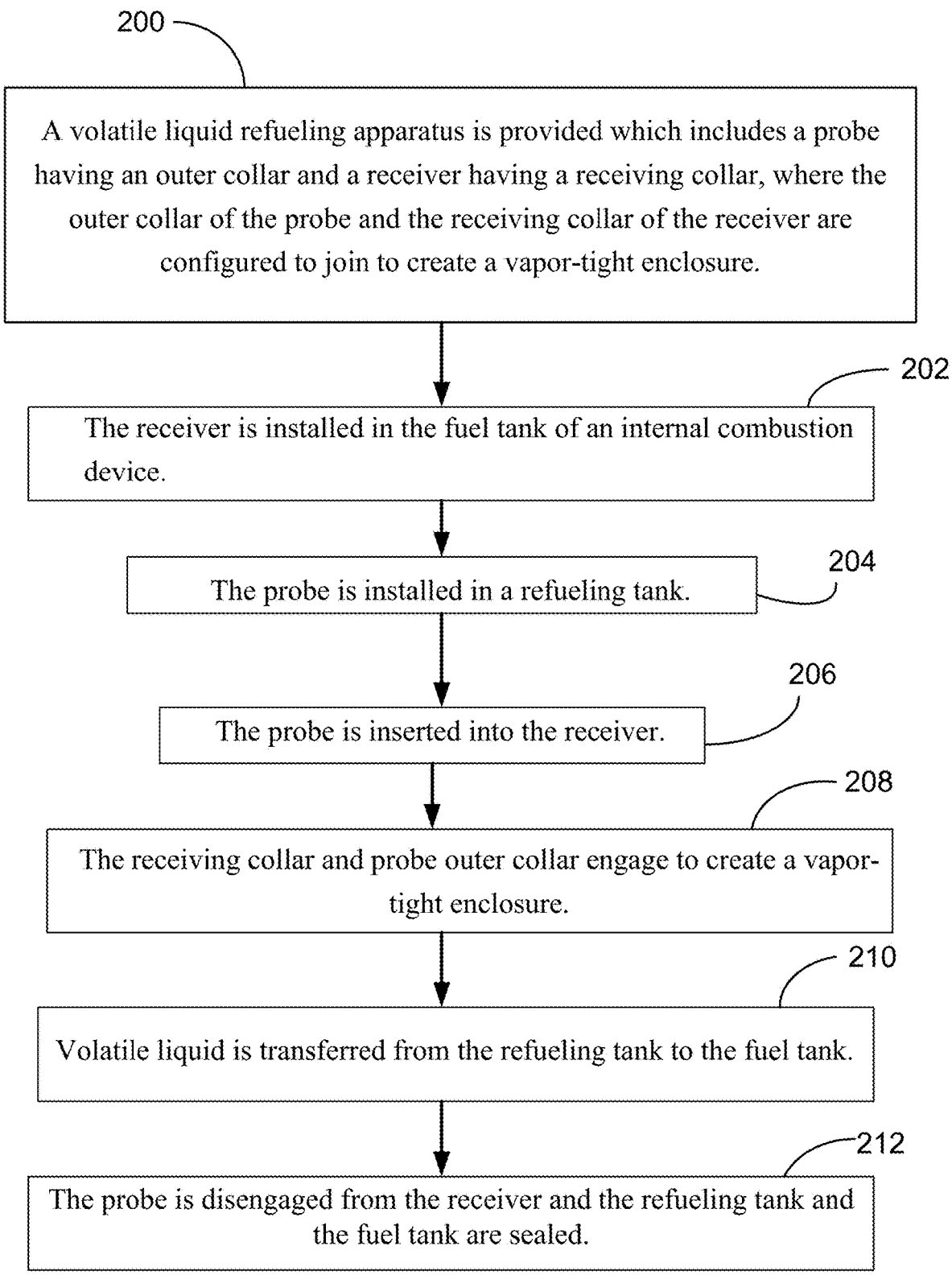
FIG. 15 shows a flow chart of the method of the present invention in detail.

As referenced above, there is an inventive method for using the apparatus which is discussed above. This same method will now be discussed in more detail, but using the same method which is outlined previously, using the same apparatus discussed above. This method is represented graphically in the flowchart of FIG. 15. The method includes the following steps:

A volatile liquid refueling apparatus is provided which includes a probe having an outer collar and a receiver having a receiving collar, where the outer collar of the probe and the receiving collar of the receiver are configured to join to create a vapor-tight enclosure. 200

The receiver is installed in the fuel tank of an internal combustion device. 202

The probe is installed in a refueling tank. 204

The probe is inserted into the receiver. 206

The receiving collar and probe outer collar engage to create a vapor-tight enclosure. 208

Volatile liquid is transferred from the refueling tank to the fuel tank. 210

The probe is disengaged from the receiver and the refueling tank and the fuel tank are sealed. 212

There are further details that can be included within these basic steps. It can be included that the apparatus has a locking mechanism. This locking mechanism can include a locking nut and a dual locking channel having two side passages. The locking mechanism can include a dual-locking mechanism which can be locked in either an open or a closed position. The probe can include a seal ring and a central tube. The receiver can include a plunger which can open the seals to open the fluid passage. These details are disclosed in the discussion of the apparatus above and were included in the parent applications to which priority is claimed.

A further need is exhibited which can be dangerous to an operator. As shown in FIGS. 16A-B, the dual locking receiver 74 described above can be locked or unlocked, and if the receiver 74 is in the "unlocked" position it is possible to accidently open the receiver 74 by depressing plunger 58 either with the user's finger or the bar tool. This would release pressure and cause a potential fuel "geyser". When the plunger 58 is in the locked position, the user may insert a bar tool or screw driver to unlock the plunger 58. While twisting the plunger to unlock it, as soon as the plunger rotates far enough to unlock, the user may press down slightly while turning. This will open the receiver allowing fuel and vapor "geyser" to escape, as shown in FIG. 16B. In a fiery environment, it can easily be seen that this could be catastrophic.

Thus, there is a need for a volatile liquids refueling apparatus which better contains volatile fuel vapors during refueling operations, and reduces incidents where fuel escapes accidentally by depressing the plunger 58 when operated manually.

Figure 22:
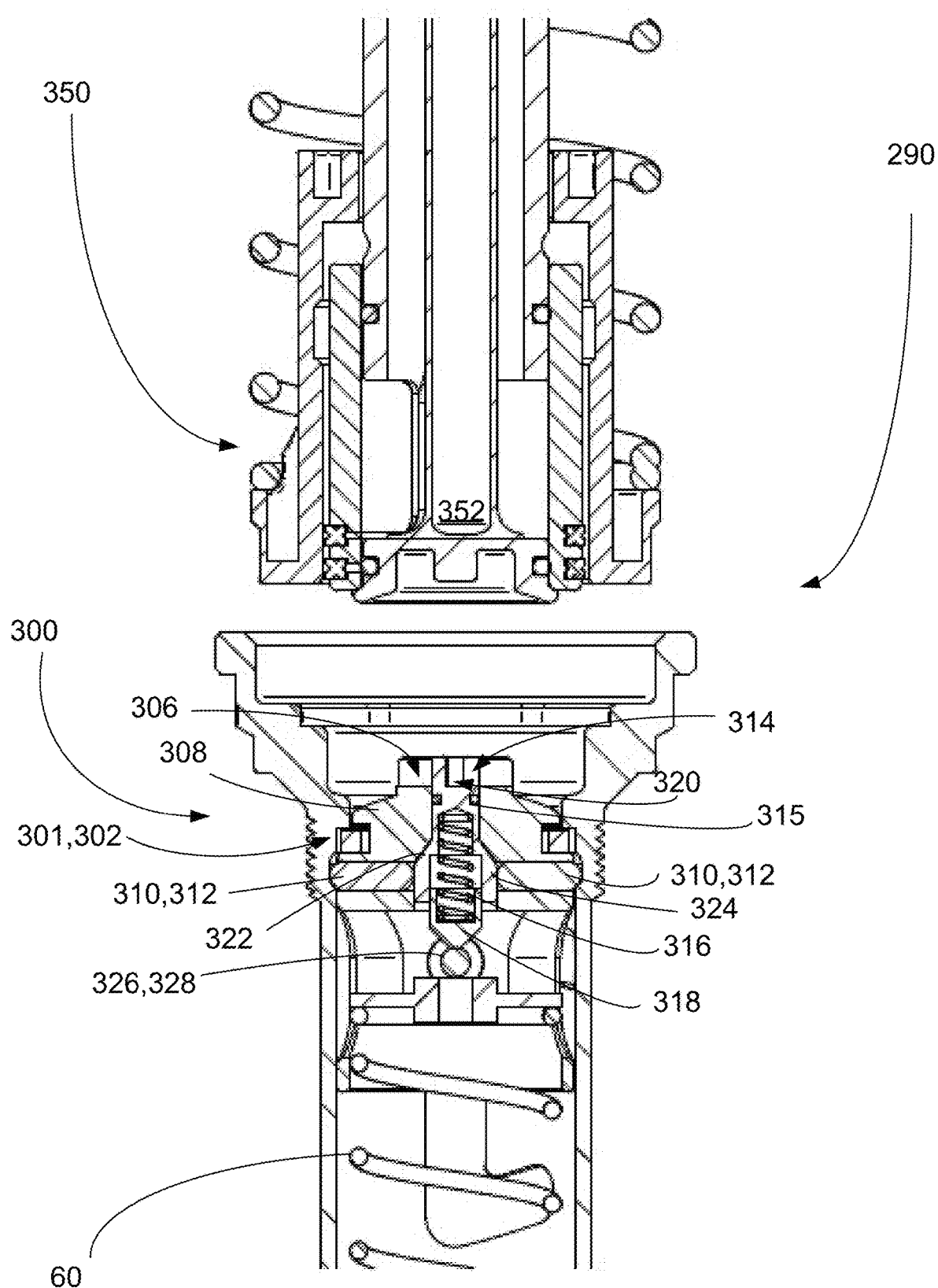
FIGS. 22-24 show cut-away views of the operation of the apparatus with receiver having safety lock and probe with actuator pin of the present invention in three stages of locking and unlocking.
Figure 23:
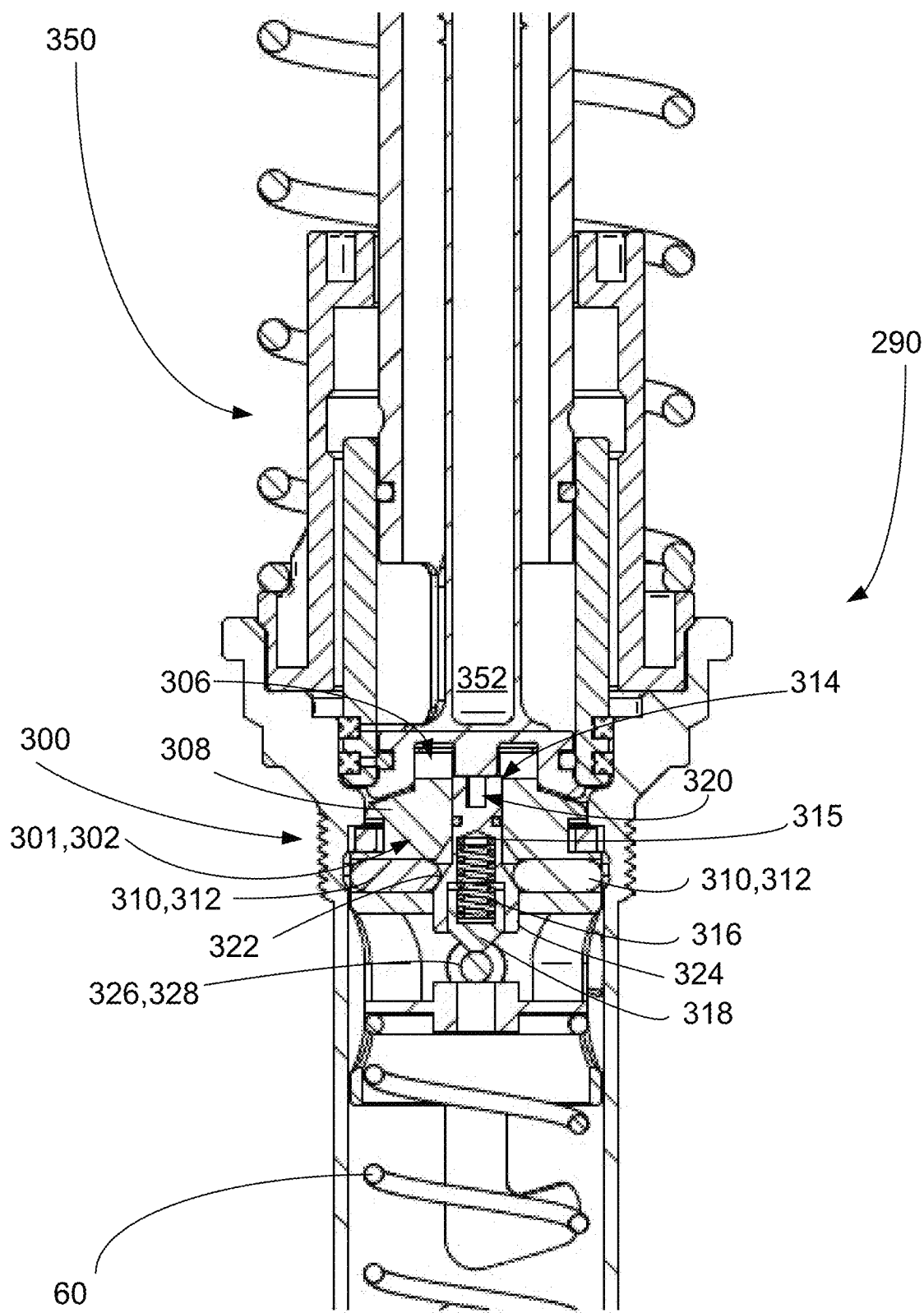
Figure 24:
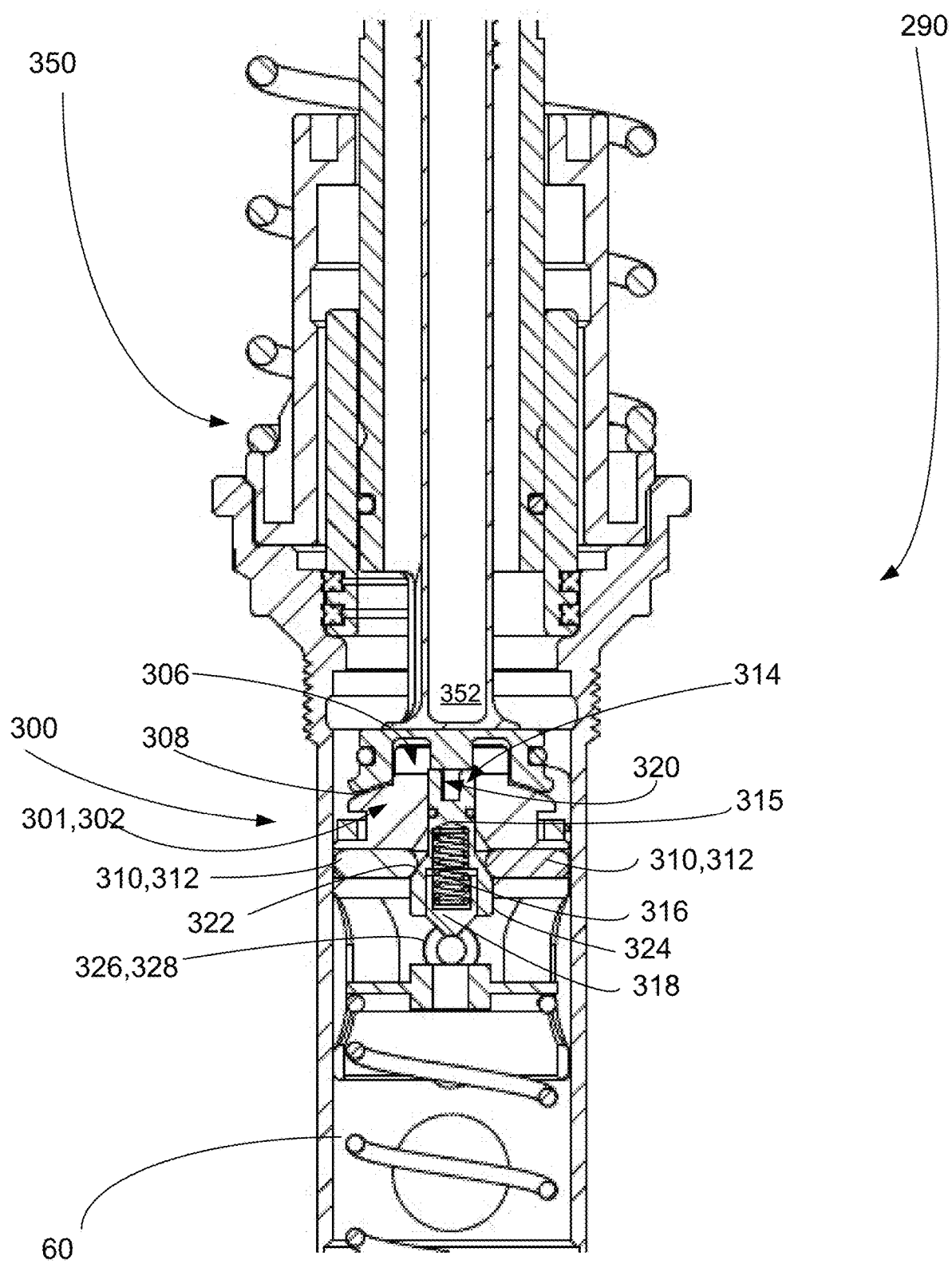

A further new embodiment answers this need by providing an apparatus with receiver having a safety lock and a probe with an actuator which automatically unlocks the safety lock. The receiver can also be unlocked manually with a bar tool such as a screwdriver. In this discussion, the apparatus which will be designated by apparatus 290 includes receiver with safety lock, designated by receiver 300, and probe with actuator pin, designated as probe 350. The complete apparatus 290 is shown in FIGS. 22-24, as the probe 350 engages the receiver 300 through three stages.

Figure 17:
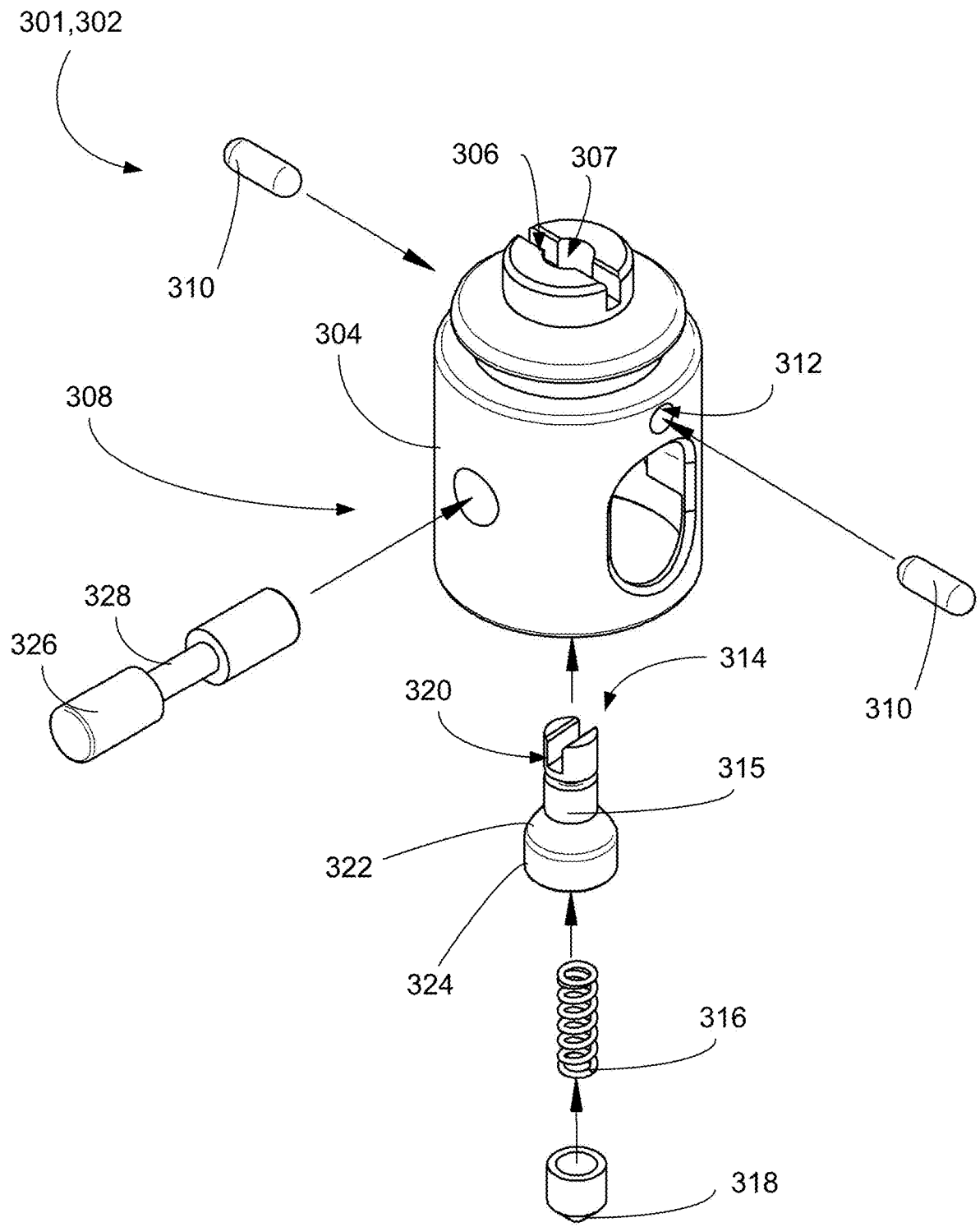
FIG. 17 shows an exploded view of the elements of the receiver with safety lock.
Figure 18:
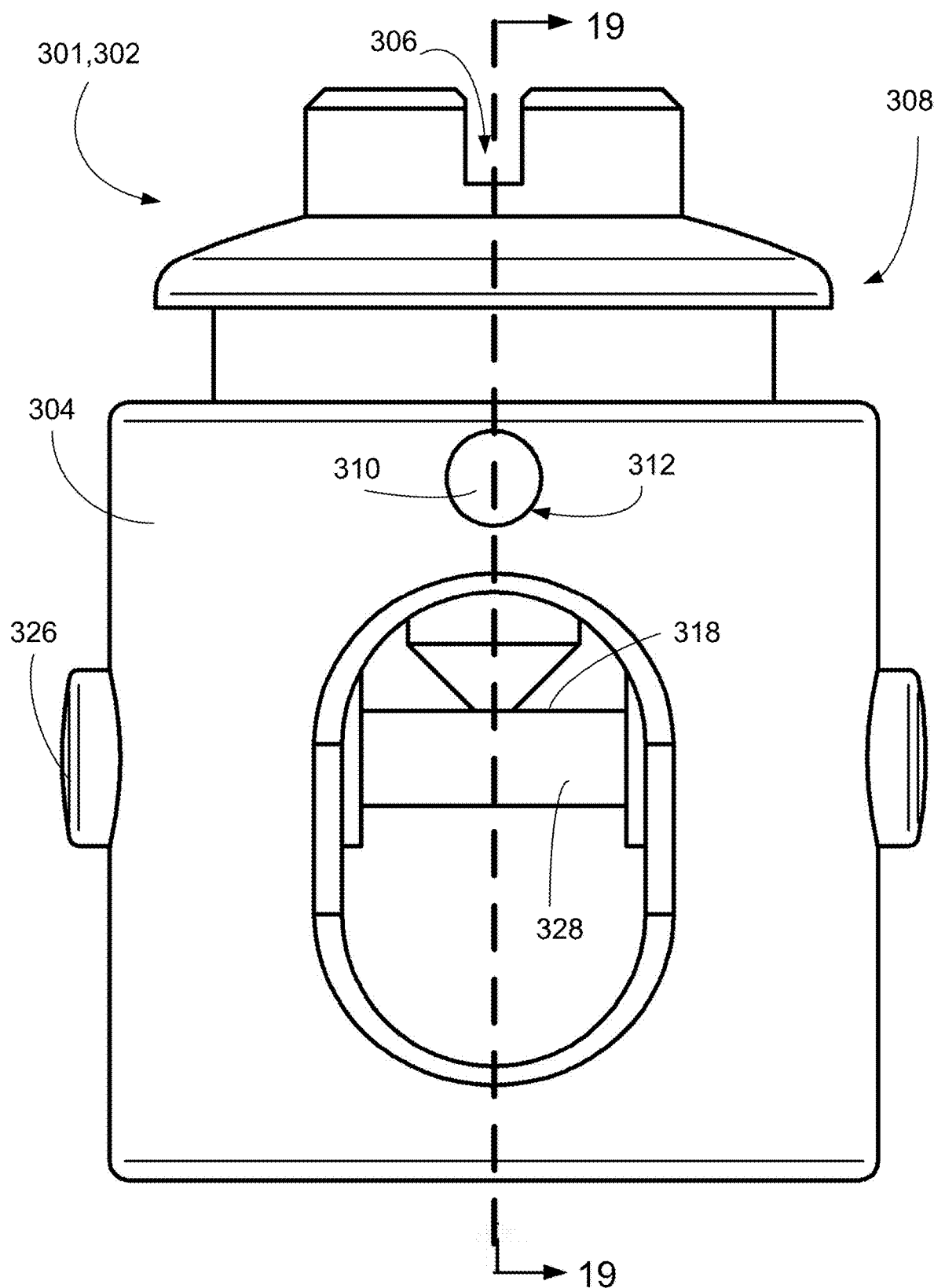
FIG. 18 show a side view of a locking plunger with safety lock of the present invention.
Figure 19:
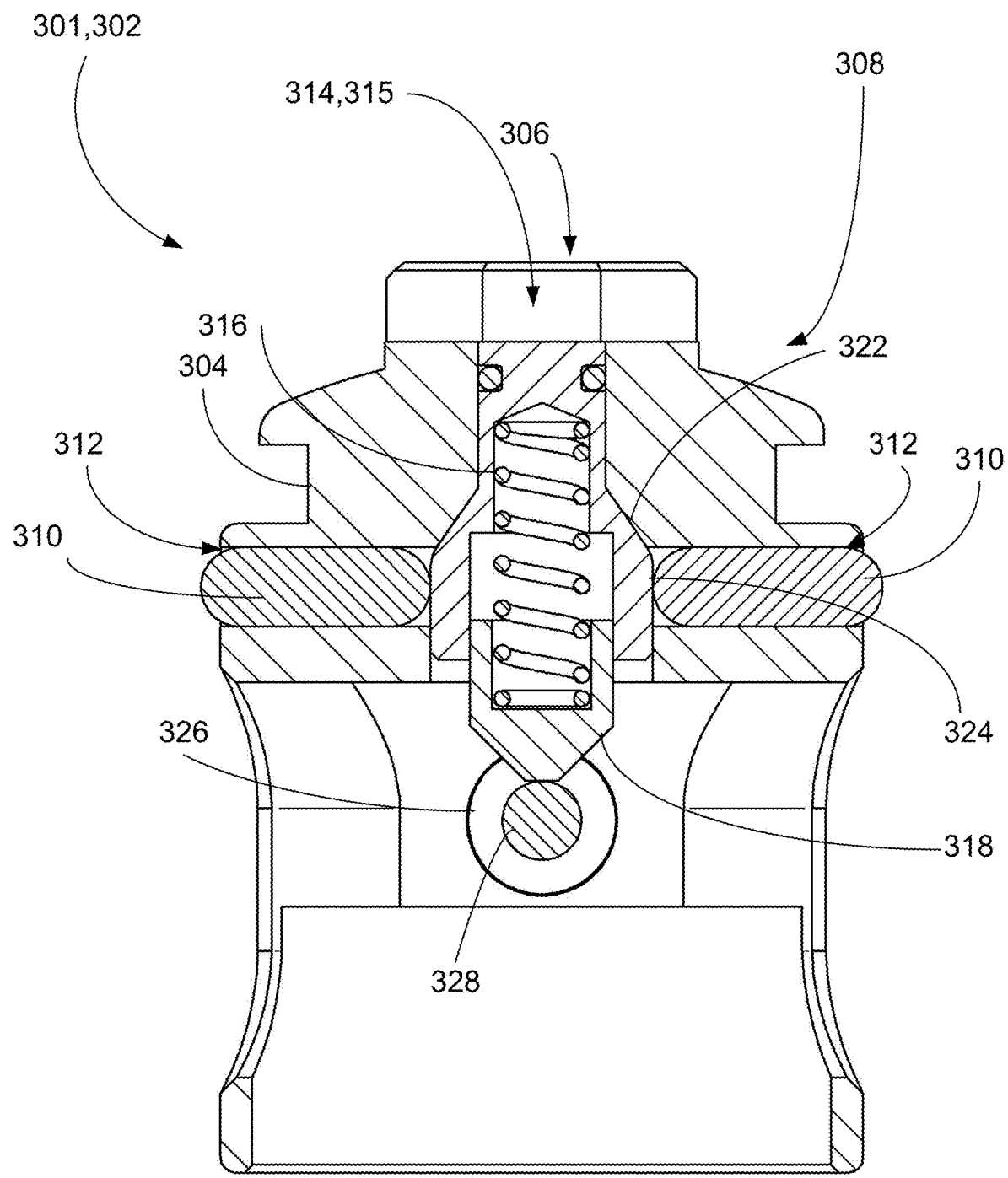
FIG. 19 shows a cut-away view of the locking plunger assembly of the present invention taken from line 19-19 of FIG. 18.

Referring now generally to FIGS. 17-19, the receiver 300 (refer also to FIGS. 22-24) includes a standard housing as discussed earlier, and this standard housing is not shown in these figures to simplify the discussion. The receiver 300 includes a safety lock 301, which includes a locking plunger assembly 302 having a housing 304 having a plunger slot 306 and a center hole 307. This is configured as a plunger 308 having lock dogs 310 which are received in lock dog bores 312, and which lock the plunger 308 in place until released. A lock ramp pin assembly 314 includes a lock ramp pin 315, a spring 316, a detent 318 and lock ramp pin slot 320. The lock ramp pin 315 has a ramp area 322, in which the diameter of the lock ramp pin 315 gradually increases, or ramps up, to a maximum diameter area 324 where it levels off. The locking plunger receiver assembly 302 also includes a plunger pin 326, having a groove 328, which is configured to receive the detent 318 of the lock ramp pin assembly 315. The ends of the plunger pin 326 extend through the housing 304 and serve as the protrusions that travel through dual locking channel as discussed above.

Figures 20A, 20B, 20C:
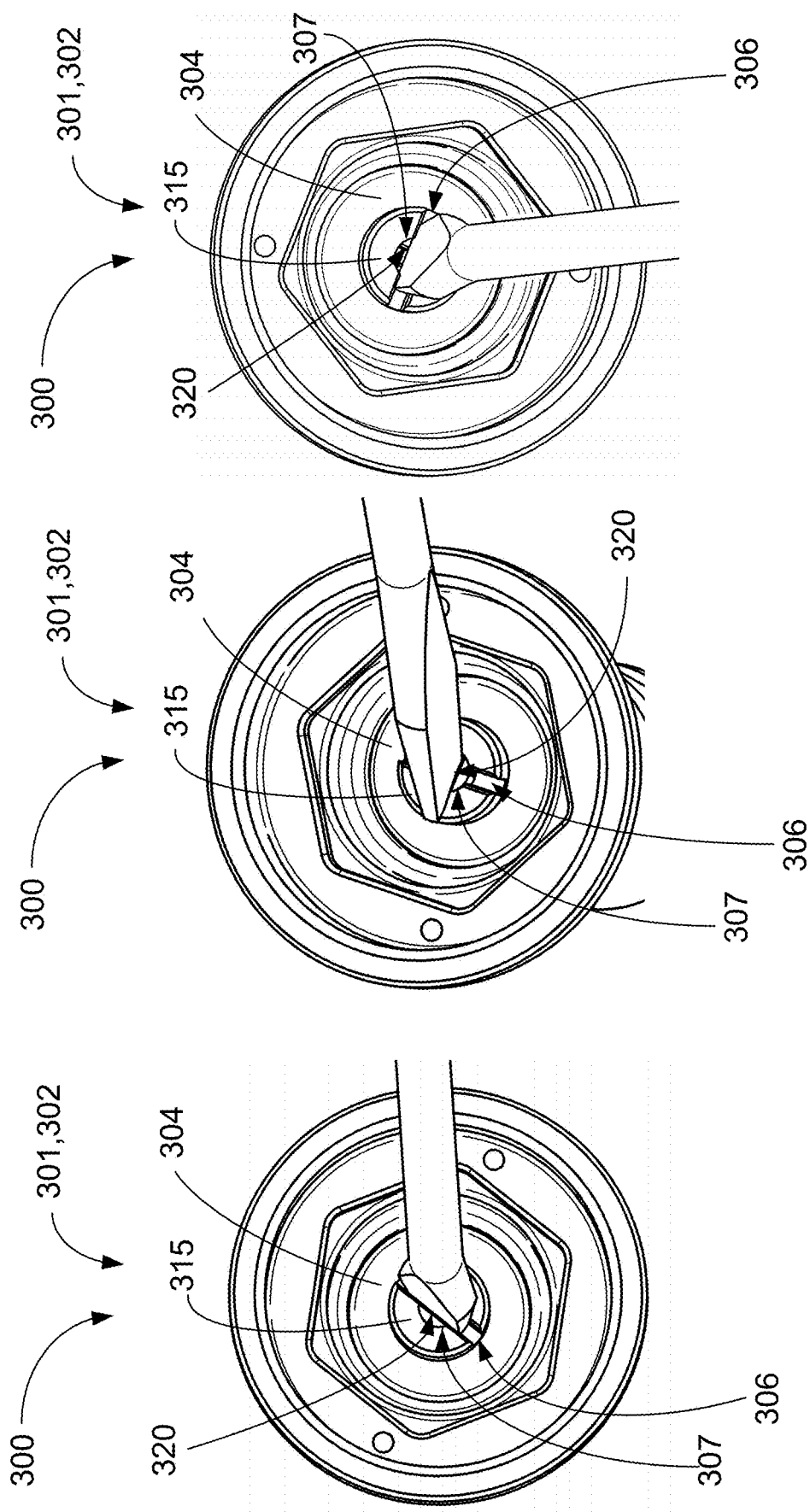
FIG. 20A-C show top plan views of the receiver with safety lock of the present invention in three stages of locking and unlocking.

FIG. 20A-C shows the use of this receiver 300 having a safety lock 301, which is locking plunger assembly 302, being manually operated using a bar tool, in this case a screwdriver.

In FIG. 20A, the locking plunger assembly 302 is in locked configuration. The screwdriver is inserted into plunger slot 306 in housing 304. The head of the lock ramp pin 315 having slot 320 extends through the center hole 307 of the housing 304. The plunger slot 306 and lock ramp pin 320 are aligned so that the screwdriver contacts the bottom of both plunger slot 306 and lock ramp pin 320. The user hopes to turn and depress locking plunger assembly 302, to move the plunger down its track to the locking open position as discussed above. However, to avoid "geysering" of fuel with dangerous consequences, in this locked position, the plunger assembly 302 would move as a whole, except that it is prevented from moving downward by the lock dogs 310, (seen in FIG. 19), which are held in place by the lock diameter area 324 of the lock ramp pin 315. The plunger assembly 302 is thus locked, as the safety lock 301 is in locked position, that is, with the plunger slot 306 and lock ramp pin 320 aligned, and is prevented from being depressed.

FIG. 20B shows that the corner of the screw driver is inserted into the lock ramp pin slot 320, and the lock ramp pin 315 is rotated until plunger slot 306 and lock ramp pin 320 are no longer aligned. A rotation of at least 30 degrees is usually sufficient, but this may vary, as long as the plunger slot 306 and lock ramp pin 320 are no longer aligned. This unlocks the safety lock 301.

FIG. 20C shows the blade of the screwdriver as it contacts the top surface of the lock ramp pin 315 first, which is at a higher level than the bottom of the plunger slot 306, since the plunger slot 306 and lock ramp pin 320 are not aligned. As the screwdriver advances, it depresses the lock ramp pin 315, and thus moves the lock ramp pin 315 downward. The ramp area 322, which has a smaller diameter than lock diameter area 324, is now in contact with the lock dogs 310, and they are released to retract. This unlocks the plunger assembly 302, which is now free to move downwards as the screwdriver blade now contacts the bottom of the plunger slot 306, so the plunger pin 326 can travel down to the lock open position, as discussed above with regard to the dual locking receiver.

This safety lock 301 ensures that the depression of the plunger is intentional, and can serve as a reminder that geysering may occur.

Figure 21:
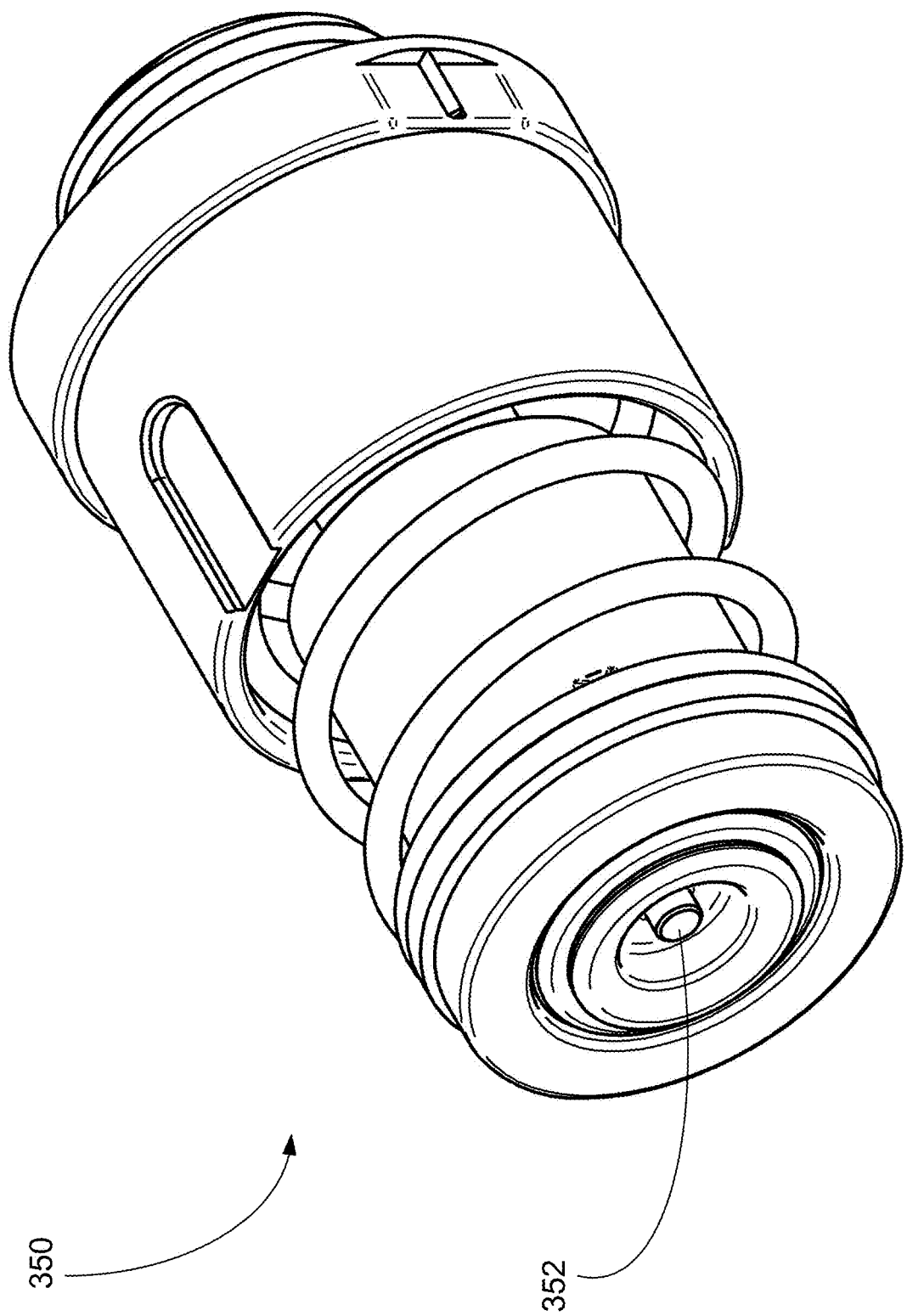
FIG. 21 shows the probe with actuator pin of the present invention.

In order to de-activate the safety lock 301 when not being manually operated, the probe that mates with the receiver must be configured to unlock the lock ramp pin assembly 314. This is accomplished by a modification of the probe 350, by the addition of an actuator pin 352 which is illustrated in FIG. 21. This actuator pin 352 is preferably a round cylindrical protrusion which contacts the top surface of the lock ramp pin 315. As the probe 350 advances, this forces the lock ramp pin 315 to depress, thus pressing the lock dogs 310 into the ramp area 322, allowing them to retract. This unlocks the locking plunger assembly 302 and allows it to travel downwards.

FIGS. 22-24 show the apparatus 290 in cut-away views of three stages of connecting the probe 350 to the receiver 300 as they attach together and the locked plunger is released.

FIG. 22 shows the probe 350 approaching the receiver 300 in preparation for engagement. The two lock dogs 310 are locked into bores 312. The locking plunger assembly 302 is thus held in place by these lock dogs 310. The device is thus locked and no fuel or vapors are allowed to escape.

FIG. 23 shows the probe 350 engaged with the receiver 300. As discussed with regard to FIG. 21, the probe 350 includes an actuator pin 352 which contacts the top surface of the lock pin 315 above slot 320. The actuator pin 352 is round and not configured to enter the slot 320 and thus depresses the lock ramp pin assembly 314 as it advances.

FIG. 24 shows the probe 350 fully connected to the receiver 300 and the safety lock 301 is disengaged. The lock dogs 310 are retracted and the plunger assembly 302 is depressed. Fuel is now free to transfer from the probe 350 to the receiver 300.

Thus, although the possibility of geysering still exists, the safety lock ensures that the depression of the plunger is intentional, and can serve as a reminder that geysering may occur.

In addition, when manually operated, movement of the plunger is opposed by the spring so that the system shuts off very rapidly as soon as the user stops actively pressing on the receiver (which requires several pounds of force to be applied). It is thought that the natural and very rapid instinct of any living human being if they were to press down and suddenly see fuel spray is to let go and back up. In this case, the spring acts to return the plunger to closed position, thus minimizing the release of fuel. Since the safety lock must be actively manipulated for the specified purpose of minimizing fuel release, known to the user, the user will be alert to this possibility and reaction time may be enhanced.

While various embodiments have been described above, it should be understood that they have been presented by way of example only, and not limitation.

The invention claimed is:

1. A volatile liquid refueling apparatus, comprising:
    a probe;
    a receiver including a dual locking mechanism whereby said apparatus can be locked in either an open position or a closed position, and a safety lock which disables or enables access to the dual locking mechanism when manually activated;
    whereas said receiver includes a locking plunger assembly, having a plunger with a housing having a plunger slot;
    whereas said safety lock unlocks and locks said locking plunger assembly;
    whereas said safety lock comprises a lock ramp pin assembly which includes a lock ramp pin having a lock diameter area and a ramp area; and
    said lock ramp pin has a ramp pin slot, and is configured such that when said plunger slot and said lock ramp pin slots are aligned, the safety lock is activated and depression of the plunger is prevented, and when said plunger slot and said lock ramp pin slots are not aligned, the safety lock is deactivated and depression of the plunger is allowed.

2. The volatile liquid refueling apparatus of claim 1 wherein:
    said lock ramp pin assembly includes lock dogs positioned in lock dogs bores, such that when said safety lock is activated, said lock dogs are constrained to contact said lock diameter area of said lock ramp pin and are prevented from release, which prevents depression of said plunger, and when said safety lock is deactivated, said lock dogs allowed to contact said ramp area of said lock ramp pin and are released, which allows depression of said plunger.

3. The volatile liquid refueling apparatus of claim 1 wherein:
    said probe includes an actuator pin which unlocks said safety lock when said probe engages with said receiver.

4. A receiver for a volatile liquid refueling apparatus, comprising:
    a dual locking mechanism whereby said apparatus can be locked in either an open position or a closed position, and a safety lock which disables or enables access to the dual locking mechanism when manually activated;
    whereas said receiver includes a locking plunger assembly, having a plunger with a housing having a plunger slot;
    whereas said safety lock unlocks and locks said locking plunger assembly;
    whereas said safety lock comprises a lock ramp pin assembly which includes a lock ramp pin having a lock diameter area and a ramp area; and
    whereas said lock ramp pin has a ramp pin slot, and is configured such that when said plunger slot and said lock ramp pin slots are aligned, the safety lock is activated and depression of the plunger is prevented and when said plunger slot and said lock ramp pin slots are not aligned, the safety lock is deactivated and depression of the plunger is allowed.

5. The receiver of claim 4 wherein:
    said lock ramp pin assembly includes lock dogs positioned in lock dogs bores, such that when said safety lock is activated, said lock dogs are constrained to contact said lock diameter area of said lock ramp pin and are prevented from release, which prevents depression of said plunger, and when said safety lock is deactivated, said lock dogs allowed to contact said ramp area of said lock ramp pin and are released, which allows depression of said plunger.

* * * * *